(12) United States Patent
Aramaki et al.

(10) Patent No.: US 7,836,639 B2
(45) Date of Patent: Nov. 23, 2010

(54) STRUCTURE MOUNTING AND SUPPORTING DEVICE AND METHOD

(75) Inventors: Yoshihiro Aramaki, Ikoma-gun (JP); Kenichi Sagayama, Habikino (JP)

(73) Assignee: Sharp Kabushiki Kaisha, Osaka (JP)

( * ) Notice: Subject to any disclaimer, the term of this patent is extended or adjusted under 35 U.S.C. 154(b) by 673 days.

(21) Appl. No.: 11/785,652

(22) Filed: Apr. 19, 2007

(65) Prior Publication Data

US 2008/0011921 A1  Jan. 17, 2008

(30) Foreign Application Priority Data

Apr. 20, 2006  (JP) .............. 2006-116915
Jan. 19, 2007  (JP) .............. 2007-010607

(51) Int. Cl.
E04F 19/00  (2006.01)

(52) U.S. Cl. ................ 52/27; 52/29; 248/237

(58) Field of Classification Search ............ 52/27, 52/29, 173.3, 506.05, 511; 248/680, 237, 248/346.01; 126/621; 136/244
See application file for complete search history.

(56) References Cited

U.S. PATENT DOCUMENTS

| | | | | | |
|---|---|---|---|---|---|
| 4,371,139 | A | * | 2/1983 | Clark | 248/237 |
| 4,677,248 | A | * | 6/1987 | Lacey | 136/244 |
| 4,733,505 | A | * | 3/1988 | Van Dame | 52/22 |
| 4,796,403 | A | * | 1/1989 | Fulton et al. | 52/713 |
| 5,249,397 | A | * | 10/1993 | Monaco | 52/126.1 |
| 5,653,079 | A | * | 8/1997 | Loeffler et al. | 52/712 |
| 5,743,063 | A | * | 4/1998 | Boozer | 52/713 |
| 5,875,592 | A | * | 3/1999 | Allman et al. | 52/90.2 |
| 6,065,255 | A | * | 5/2000 | Stern et al. | 52/173.3 |
| 6,414,237 | B1 | * | 7/2002 | Boer | 136/251 |
| 6,641,325 | B2 | * | 11/2003 | Schwarz | 403/329 |
| 6,966,531 | B2 | * | 11/2005 | Curtin | 248/237 |
| 7,175,140 | B2 | * | 2/2007 | Johnson et al. | 248/148 |
| 7,600,349 | B2 | * | 10/2009 | Liebendorfer | 52/173.3 |
| 2003/0101662 | A1 | * | 6/2003 | Ullman | 52/27 |
| 2008/0053008 | A1 | * | 3/2008 | Ohkoshi et al. | 52/173.1 |
| 2009/0019796 | A1 | * | 1/2009 | Liebendorfer | 52/173.3 |

FOREIGN PATENT DOCUMENTS

| | | |
|---|---|---|
| JP | 06-008560 | 2/1994 |
| JP | 07-202239 | 8/1995 |
| JP | 08-070132 | 3/1996 |

(Continued)

*Primary Examiner*—Brian E Glessner
*Assistant Examiner*—Joshua Ihezie
(74) *Attorney, Agent, or Firm*—Nixon & Vanderhye, PC

(57) ABSTRACT

There is provided a structure mounting and supporting device that can facilitate mounting a structure on a roof. The device allows a plurality of fixing members to be fixed to sheathing, which underlies a roofing material, perpendicularly, while allowing a supporting member fixing and supporting the structure and the fixing members to be fixed together at their respective side portions. More specifically, the supporting member to be carried by the plurality of fixing members has one end initially connected to one fixing member. The supporting member thus has the other end pivotably to provide a degree of freedom to a position at which the other fixing member and the supporting member are secured together, in mounting and fixing the fixing member and the supporting member together. The structure mounting and supporting device is thus applicable to a roof having a plurality of pieces of sheathing inclined at different angles.

11 Claims, 25 Drawing Sheets

FOREIGN PATENT DOCUMENTS

| | | |
|---|---|---|
| JP | 08-093159 | 4/1996 |
| JP | 09-177272 | 7/1997 |
| JP | 11-002011 | 1/1999 |
| JP | 2001303724 | 10/2001 |
| JP | 2004-332200 | 11/2004 |
| JP | 2005-264441 | 9/2005 |
| JP | 2006-052529 | 2/2006 |

* cited by examiner

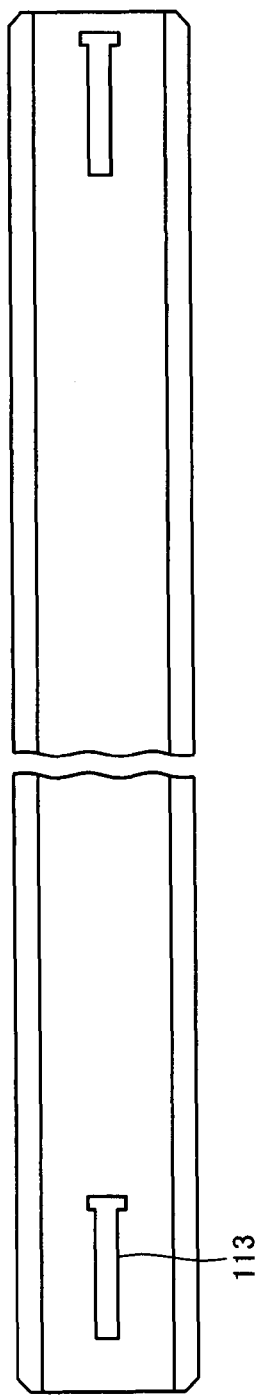
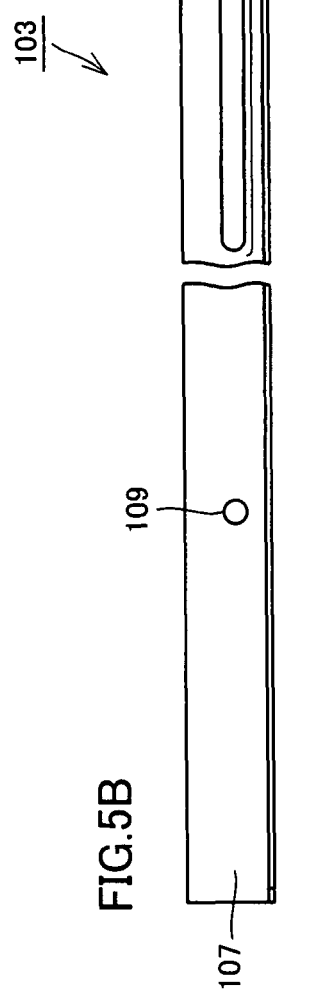
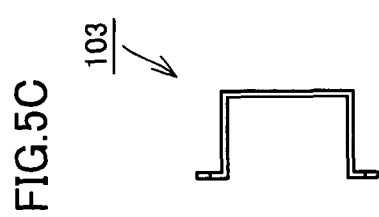
FIG.5A
FIG.5B
FIG.5C

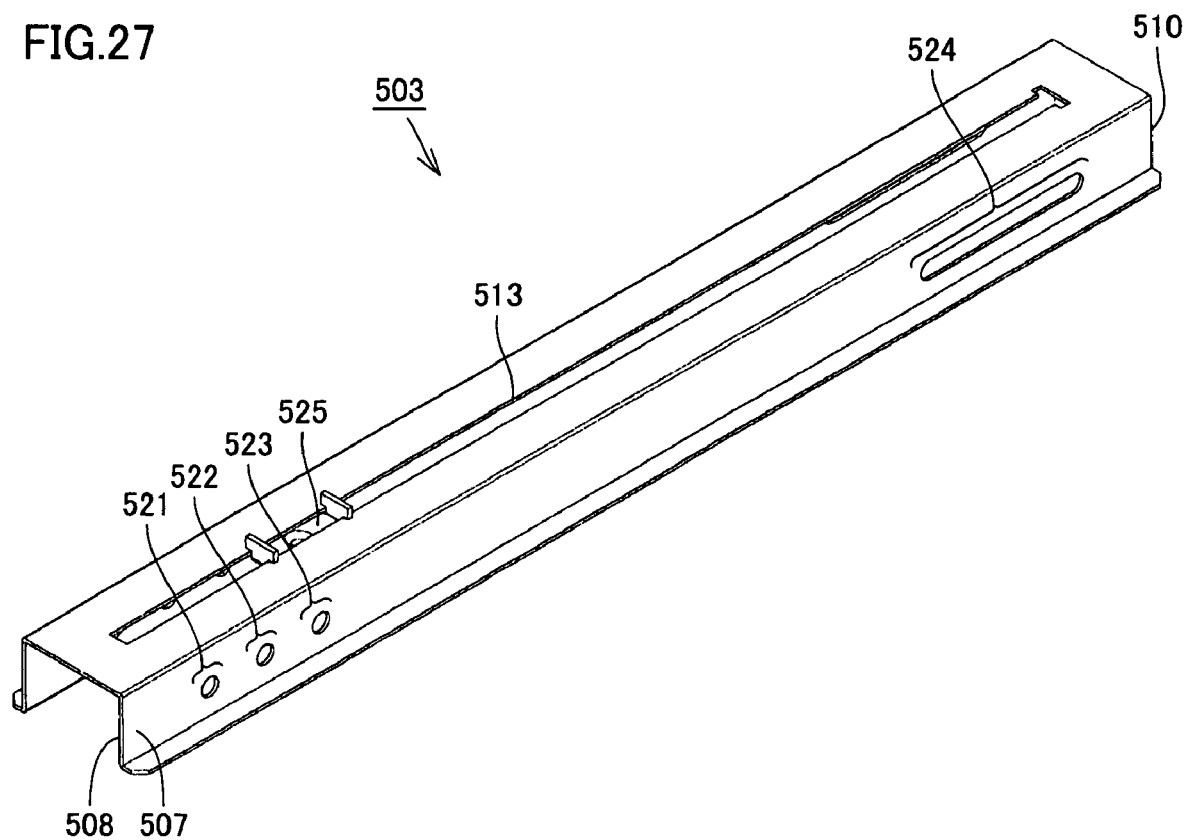

STRUCTURE MOUNTING AND SUPPORTING DEVICE AND METHOD

This nonprovisional application is based on Japanese Patent Applications Nos. 2006-116915 and 2007-010607, filed with the Japan Patent Office on Apr. 20, 2006 and Jan. 19, 2007, respectively, the entire contents of which are hereby incorporated by reference.

BACKGROUND OF THE TECHNOLOGY

1. Field of the Technology

The present technology relates to structure mounting and supporting devices and methods and particularly to such devices and methods that mount and support structures in the form of panels on roofs.

2. Description of the Background Art

When a structure is to be attached to a roof, a supporting device is required to mount the structure. Typically, the structure is fixed to the supporting device.

One such structure attached to a roof of a building is a solar cell apparatus. In recent years, solar cell apparatuses have increasingly been used, and many of them are attached to roofs of houses.

When the solar cell apparatus is installed on a roof of a house, metal frames or the like are assembled on a top surface of the roof to form a base. The base is formed as a part of the structure. The base is fixed to the roof by a supporting device. The solar cell apparatus includes a solar cell module in the form of a panel. Typically, the solar cell module is fixed to the base.

Conventionally there has been proposed a building allowing solar cell modules to be arranged in place of roof tiles across its roof to thatch the roof therewith and thus installed over an increased area to provide efficient photovoltaic power generation (see Japanese Patent Laying-open No. 2004-332200 for example). Furthermore there has been proposed an apparatus capable of combining solar cell modules different in size and thus arranging them across a roof to maintain the roofs aesthetic appearance (see Japanese Patent Laying-open No. 2005-264441 for example).

The techniques proposed in Japanese Patent Laying-open Nos. 2004-332200 and 2005-264441 appear to be intended for application mainly to houses having roofs having flat surfaces. Accordingly it is difficult to apply the techniques to houses having roofs having curved surfaces, such as domed roofs. Furthermore it is also difficult to apply the techniques to structures varying in dimension as seen in the direction of the tilt of the roof. Furthermore, it is also difficult to allow for a roof having a base material, such as sheathing, tile or the like, provided stepwise, as seen in the direction of the tilt of the roof, and varying in exposure dimension, as seen in the direction of the tilt of the roof, and dimension in height. Exposure dimension as referred to herein is an actual dimension of a single piece of a base material minus that of a portion of the single piece hidden by another piece overlapping the single piece to thatch a roof. In the present specification an exposure dimension of a base material in the direction of a tilt of a roof will be referred to as an exposure length. Furthermore, a dimension in height as referred to herein is a distance, as seen in a direction perpendicular to a surface of a roof, between the top surfaces of two pieces, respectively, of a base material that are adjacent in the direction of the tilt of the roof.

To mount a structure in the form of a panel on a roof, a base is typically fixed to the roofs base material, such as sheathing provided under a roofing material and serving as a base material to support the roofing material. In that case, the base is fixed by a member fixed to the base material perpendicularly. If the structure is to be mounted on a curved roof, and the base fixing member is fixed to the base material perpendicularly, the base fixing member would have a top surface misaligned and cannot fix the base successfully. Furthermore, if more than one structure are mounted in the direction of the tilt of the roof, it is necessary to form a base to which the structure is fixed in conformity to a dimension of the structure as seen in the direction of the tilt of the roof, and if the base material is stepwise varying in exposure length and dimension in height, it is difficult to mount thereon structures different in dimension in the direction of the tilt of the roof such that the structures are parallel to the base material.

SUMMARY OF THE TECHNOLOGY

Therefore a main object of the present technology is to provide a structure mounting and supporting device and method that can be readily applied to a roof having a curved surface or a step, and a structure mounting and supporting device and method that can facilitate mounting a structure different in dimension, as seen in the direction of a tilt of a roof, on the roof, and allows a plurality of structures to be mounted in the direction of the tilt of the roof over a stepwise base material that varies in exposure length and dimension in height such that the structures are parallel to the stepwise base material. Another object of the present technology is to provide a structure mounting and supporting device that can be readily fabricated, maintain a roofs appearance aesthetically, and have durability, and a method of mounting and supporting a structure that employs the structure mounting and supporting device to facilitate installation.

The present structure mounting and supporting device is a structure mounting and supporting device for attaching a structure on a top surface of a roof having a plurality of pieces of a base material. It includes a plurality of fixing members and a supporting member. The plurality of fixing members are fixed to the base material and have a side portion having a fixing portion fixing the supporting member. The supporting member is carried by the plurality of fixing members to fix and support the structure. The supporting member has one end having a side portion provided with a first attachment portion, and the other end having a side portion provided with a second attachment portion. At the first attachment portion the supporting member is connected to one fixing member of the plurality of fixing members at the fixing portion pivotably relative to one fixing member such that a direction perpendicular to the side portion of one end of the supporting member serves as an axis of pivotation. At the second attachment portion the supporting member is secured to the other one of the plurality of fixing members at the fixing portion with a securing member. The second attachment portion provides a plurality of positions allowing the securing member to secure the second attachment portion to the fixing portion of the other fixing member.

The structure mounting and supporting device allows a plurality of fixing members to be fixed to sheathing, which underlies a roofing material, perpendicularly, while allowing a supporting member fixing and supporting the structure and the fixing members to be fixed together at their respective side portions. More specifically, the supporting member to be carried by the plurality of fixing members has one end initially connected to one fixing member. The supporting member thus has the other end pivotably to provide a degree of freedom to a position at which the other fixing member and the supporting member are secured together, in mounting and fixing the fixing member and the supporting member together. The structure mounting and supporting device is thus applicable to a roof having a plurality of pieces of a base material inclined at different angles. Furthermore, it can be enhanced in installability, and readily attached to a roof. Furthermore, it allows a structure to be mounted along a roof surface. The structure can thus appear to be integrated with the roof and as a result appear more aesthetically, and also be increased in resistance to wind.

Preferably the fixing portion has a portion having a round fixing hole. The first attachment portion has a portion having a round attachment hole. The second attachment portion has a portion having an elongate hole.

The round fixing hole of the fixing portion of one fixing member and the round attachment hole of the first attachment portion of the supporting member can be connected together for example with a bolt. Furthermore, the fixing hole of the fixing portion of the other fixing member and the elongate hole of the second attachment portion of the supporting member can be connected together for example with a bolt or a similar securing member at any position in the elongate hole of the second attachment portion. More specifically, the supporting member to be carried by the plurality of fixing members has one end initially connected to one fixing member. The supporting member thus has the other end pivotably to provide a degree of freedom to a position at which the other fixing member and the supporting member are secured together, in mounting and fixing the fixing member and the supporting member together. The structure mounting and supporting device is thus applicable to a roof having a plurality of pieces of a base material inclined at different angles. It should be noted that the fixing hole and the attachment hole are not required to be a perfect circle: they are only required to be substantially a circle. Furthermore the elongate hole as referred to herein indicates a hole in the form of a rectangle that has a pair of opposite sides each adjacent outside to a semicircle having a diameter equal to the side and thus has opposite ends, an elliptical geometry, or the like. The elongate hole may be inclined relative to the longitudinal direction of the supporting member. Preferably, it is formed to be parallel to the longitudinal direction of the supporting member.

Preferably the second attachment portion has a portion having an elongate hole extending in a longitudinal direction of the supporting member.

The second attachment portion has the elongate hole that is elongate laterally in a direction parallel to the base material. Furthermore, the fixing hole of the fixing portion of the other fixing member and the elongate hole of the second attachment portion of the supporting member can be connected together at any position in the elongate hole of the second attachment portion. More specifically, the supporting member to be carried by the plurality of fixing members has one end initially connected to one fixing member. The supporting member thus has the other end pivotably to provide a degree of freedom to a position at which the other fixing member and the supporting member are secured together, in mounting and fixing the fixing member and the supporting member together. The structure mounting and supporting device is thus applicable to a roof having a plurality of pieces of a base material inclined at different angles.

Furthermore, preferably, the supporting member includes more than one first attachment portion. This allows the plurality of fixing members to be fixed to the base material, and the supporting member fixing and thus supporting a structure and the fixing member to be fixed at their respective side portions. More specifically, one fixing member and the supporting member are connected together for example by inserting a bolt through the fixing hole and the attachment hole. The supporting member thus has the other end pivotably, and the other fixing member has the fixing hole connected to the supporting member's elongate hole at a desired position so as to provide a degree of freedom to a position at which the other fixing member and the supporting member are secured together, in mounting and fixing the fixing member and the supporting member together. The structure mounting and supporting device is thus applicable to a roof having a plurality of pieces of a base material. Furthermore, it can be enhanced in installability, and readily attached to a roof.

The plurality of fixing members can be fixed to the base material at any position. The fixing members can thus be fixed to the base material in the direction of a tilt of a roof such that they are spaced in accordance with the base material's exposure length. Furthermore, as more than one attachment hole can be provided, the position at which the supporting member is set relative to and fixed to the fixing member, as seen in the direction of the tilt of the roof, can be adjusted. Thus a position of the attachment hole and the elongate hole can be selected that allows the supporting member to be parallel to the base material. Even if the base material is stepwise varying in exposure length and dimension in height the supporting member can be placed parallel to the base material. This allows a structure to be mounted along a surface of the roof. The structure can thus appear to be integrated with the roof and as a result appear more aesthetically, and also be increased in resistance to wind.

Furthermore, preferably, the first attachment portion has a portion having more than one attachment hole aligned in the longitudinal direction of the supporting member. The fixing hole and the elongate hole are defined on a single straight line extending in the longitudinal direction of the supporting member. The elongate hole has an effective length determined by $$x+2\{\sqrt{(L^2+R^2)}-L\}$$

where x represents a length of a line segment bounded by centers of those two attachment holes, respectively, of more than one attachment hole which are the most distant from each other, L represents an exposure dimension per piece of the base material in a direction of a tilt of the roof, i.e., exposure length, and R represents a distance in a direction perpendicular to a surface of the roof between top surfaces of those two members, respectively, of the base material which are adjacent in the direction of the tilt of the roof, i.e., a dimension in height, i.e., a difference between the steps of two stepwise pieces of the base material.

This ensures that the supporting member is mounted to a stepwise base material. More specifically, If the supporting member is arranged in the direction of the tilt of the roof to have one end closer to the eaves and the other end closer to the ridge, and the base material is stepwise having a step having a dimension in height R and the supporting member is arranged to straddle the step, then the supporting member has the other end distant by dimension in height R from that base material at which the supporting member has one end fixed to one fixing member. Accordingly, if the elongate hole has a length x, the other fixing member's fixing hole and the supporting member's elongate hole do not overlap, and the other fixing member and the supporting member cannot be secured together. In contrast, if the elongate hole is excessively elongate, the supporting member may be impaired in strength. In other words, a plurality of elongate holes is more advantageous in terms of strength than one such hole increased in length. Accordingly, the elongate hole is determined in effective length in accordance with dimension in height R, more specifically, in a range of 100% to 105% of $$x+2\{\sqrt{(L^2+R^2)}-L\}$$

to ensure that the supporting member is mounted even to the stepwise base material. Note that the effective length of the elongate hole indicates a length of a line segment bounded by the centers of two fixing holes, respectively, placed at the opposite ends of the longer diameter of the elongate hole if the fixing member has the fixing hole placed to overlap each of the opposite ends of the longer diameter of the elongate hole.

Furthermore, preferably, the supporting member has more than one second attachment portion. Two second attachment portions adjacent in the direction of the tilt of the roof have their respective elongate holes with an effective interval therebetween that is smaller than the length of one of line segments bounded by the centers of any two adjacent attachment holes that is minimum in length.

When the supporting member has the first attachment portion connected at one of the plurality of attachment holes to the fixing member, the other fixing member to be fixed to the second attachment portion at an elongate hole may have the fixing hole positioned at a portion of the second attachment portion between a plurality of elongate holes, i.e., a portion that does not have an elongate hole. The present structure mounting and supporting device with elongate holes having an effective interval therebetween smaller than the length of one of line segments bounded by the centers of any two adjacent attachment holes that is minimum in length allows the fixing member and the supporting member to be fixed together by displacing the supporting member in the longitudinal direction. In other words, the supporting member can have another one of the plurality of attachment holes connected to one supporting member, and the other fixing member can have the fixing hole positioned to overlap an elongate hole of the second attachment portion. Thus the other fixing member's fixing hole and the second attachment portion's elongate hole can be connected together to fix the fixing member and the supporting member together. Note that the effective interval of the elongate holes indicates the length of a line segment bounded by the centers of two fixing holes if it is assumed that the fixing member has the fixing hole placed to overlap each of those ends of the longer diameters of two adjacent elongate holes, respectively, which are adjacent to each other. For three or more elongate holes, the effective interval of the elongate holes is the length of the longest one of such line segments.

Furthermore, preferably, the second attachment portion has a portion having an elongate hole extending in the direction of the shorter side of the side portion of the supporting member.

The second attachment portion has an elongate hole elongate vertically or in a direction perpendicular to the base material, and the fixing hole of the fixing portion of the other fixing member and the elongate hole of the second attachment portion of the supporting member can be connected together at any position in the elongate hole of the second attachment portion. More specifically, the supporting member to be carried by the plurality of fixing members has one end initially connected to one fixing member. The supporting member thus has the other end pivotably to provide a degree of freedom to a position at which the other fixing member and the supporting member are secured together, in mounting and fixing the fixing member and the supporting member together. The structure mounting and supporting device is thus applicable to a roof having a plurality of pieces of a base material inclined at different angles.

Furthermore, preferably, the supporting member includes a plurality of second attachment portions. As the second attachment portion has a portion having an elongate hole, the supporting member accordingly has a portion having a plurality of elongate holes. The position at which the fixing hole of the fixing portion of the other fixing member and an elongate hole of a second attachment portion of the supporting member are connected together can be selected from an increased number of positions, as desired. The position at which the other fixing member and the supporting member are secured together can be provided with an increased degree of freedom in mounting and fixing the fixing member and the supporting member. This can further facilitate application to a roof having a plurality of pieces of a base material that are inclined at different angles.

Furthermore, preferably, the supporting member has opposite ends, as seen in the longitudinal direction, having a joint joining more than one supporting member together in the longitudinal direction.

When a plurality of structure mounting and supporting devices are to be mounted on a roof, a first supporting member has one end initially connected to one fixing member. The first supporting member can thus have the other end pivotably, and the first supporting member can have the other end joined to one end of a second supporting member adjacent to the first supporting member. This allows the plurality of structure mounting and supporting devices to be mounted on the roof uniformly. Furthermore, if a roof has a curved surface, structures can be installed along the surface. The structures thus appear to be integrated with the roof and as a result appear more aesthetically. Furthermore the plurality of structure mounting and supporting devices integrally fixed together can mutually enhance their respective resistances to wind.

The present technology provides a method of mounting and supporting a structure, attaching the structure on a top surface of a roof having a plurality of pieces of a base material, including the steps of: fixing a plurality of fixing members to the base material; fixing a supporting member to the plurality of fixing members; and supportively mounting the structure to a frame attached to more than one supporting member. The step of fixing the supporting member includes the steps of: connecting the supporting member to one of the fixing members; adjusting a position at which another one of the fixing members and the supporting member are secured together; and securing the other one of the fixing members and the supporting member together. The step of connecting the supporting member to one of the fixing members includes connecting the supporting member to one of the fixing members together by connecting a first attachment portion of a side portion of one end of the supporting member to one fixing portion of a side portion of one of the fixing members such that the supporting member and one of the fixing members are pivotable relative to each other with a direction perpendicular to the side portion of one end of the supporting member serving as an axis of pivotation. The step of adjusting a position at which another one of the fixing members and the supporting member are secured together includes adjusting a position at which another fixing portion defined at a side portion of another one of the fixing members and a second attachment portion defined at a side portion of the other end of the supporting member are secured together. The step of securing the other one of the fixing members and the supporting member together includes securing the other fixing portion of a side portion of the other fixing member and the second attachment portion of a side portion of the other end of the supporting member together.

The structure mounting and supporting method allows a plurality of fixing members to be fixed to a base material, which underlies a roofing material, perpendicularly, while allowing a supporting member fixing and supporting the structure and the fixing members to be fixed together at their respective side portions. More specifically, the supporting member to be carried by the plurality of fixing members has one end initially connected to one fixing member. The supporting member thus has the other end pivotably to provide a degree of freedom to a position at which the other fixing member and the supporting member are secured together, in mounting and fixing the fixing member and the supporting member together. The structure mounting and supporting method is thus applicable to a roof having a plurality of pieces of a base material inclined at different angles. Furthermore, it can be enhanced in installability, and readily attached to a roof. Furthermore, it allows a structure to be mounted along a roof surface. The structure can thus appear to be integrated with the roof and as a result appear more aesthetically, and also be increased in resistance to wind.

Thus the structure mounting and supporting device allows a plurality of fixing members to be fixed to a base material, which underlies a roofing material, perpendicularly, while allowing a supporting member fixing and supporting the structure and the fixing members to be fixed together at their respective side portions. More specifically, the supporting member to be carried by the plurality of fixing members has one end initially connected to one fixing member. The supporting member thus has the other end pivotably to provide a degree of freedom to a position at which the other fixing member and the supporting member are secured together, in mounting and fixing the fixing member and the supporting member together. Furthermore the present structure mounting and supporting device can facilitate installing on a roof a structure different in dimension as seen in the direction of a tilt of a roof, and if a plurality of structures are installed in the direction of the tilt of the roof on a stepwise base material different in exposure length and dimension in height, the structures can be installed parallel to the base material. This can further facilitate application to a roof having a plurality of pieces of a base material. Furthermore, it can be enhanced in installability, and readily attached to a roof. Furthermore, it allows a structure to be mounted along a roof surface. The structure can thus appear to be integrated with the roof and as a result appear more aesthetically, and also be increased in resistance to wind.

The foregoing and other objects, features, aspects and advantages will become more apparent from the following detailed description when taken in conjunction with the accompanying drawings.

BRIEF DESCRIPTION OF THE DRAWINGS

FIGS. 5A-5C are plan, front and side views, respectively, of a supporting member shown in FIG. 1.

FIG. 27 is a perspective view of an exemplary variation of the elongate mounting hardware.

DESCRIPTION OF THE PREFERRED EMBODIMENTS

Hereinafter reference will be made to the drawings to describe the embodiments of the present technology. In the figures, identical or like components are identically denoted and will not be described repeatedly.

First Embodiment

Figure 1:
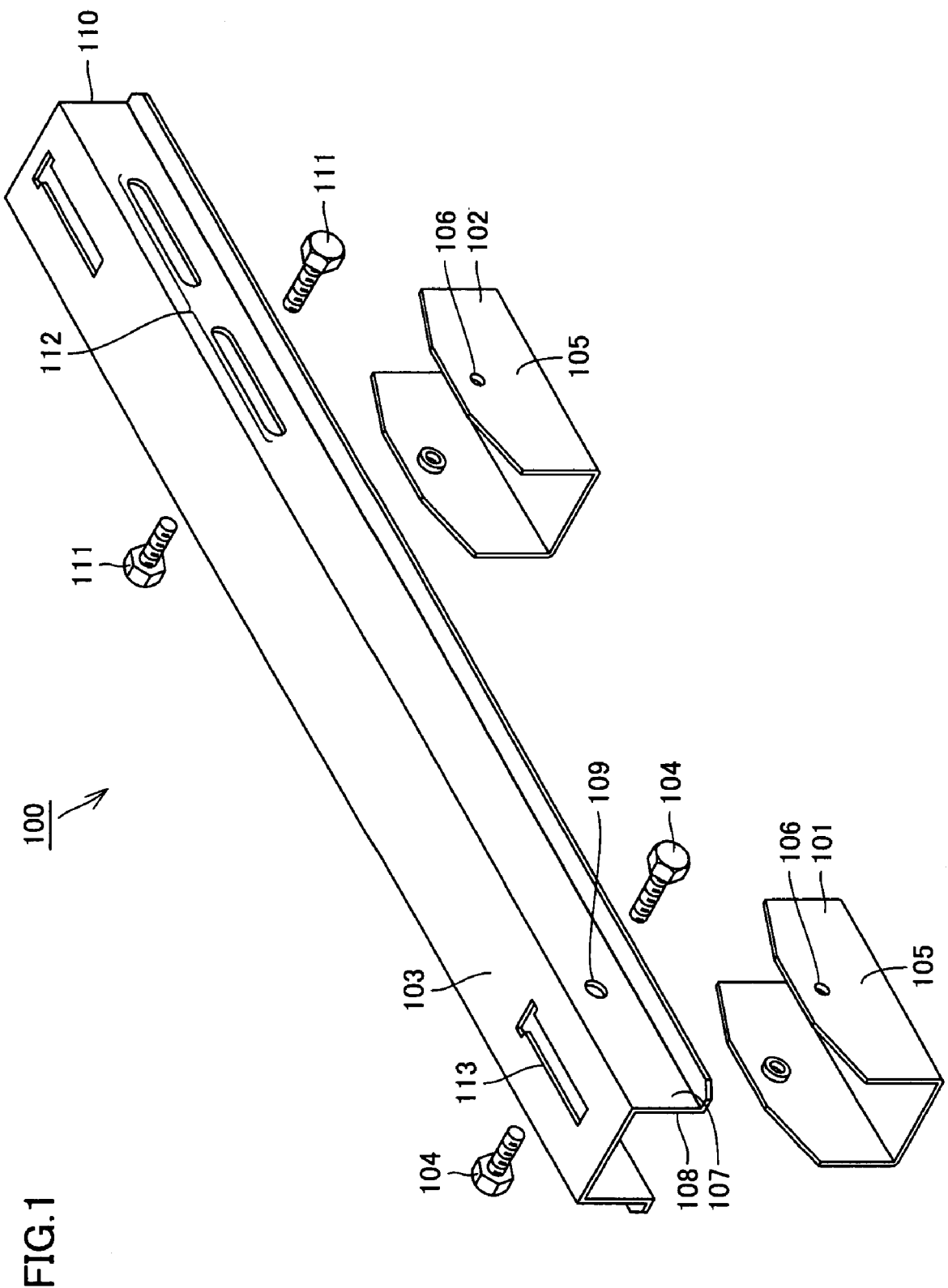
FIG. 1 is a perspective view of an external appearance of a structure mounting and supporting device of a first embodiment.

FIG. 1 shows a structure mounting and supporting device 100 including a plurality of fixing members represented by one supporting hardware 101 and the other supporting hardware 102, and a supporting member represented by elongate mounting hardware 103.

One supporting hardware 101 and the other supporting hardware 102 have a side portion 105 having a fixing portion for fixing elongate mounting hardware 103. The fixing portion has a portion having a round fixing hole represented by a drawn tap 106. In other words, at drawn tap 106, the supporting hardware's side portion 105 has a drawn hole. The drawn hole has an internal side worked to be helically threaded to allow attachment with a screw rod.

Elongate mounting hardware 103 has a first attachment portion and a second attachment portion. More specifically, elongate mounting hardware 103 has the first attachment portion situated at one end 108 at a pair of opposite side portions 107 and having a portion having a round attachment hole represented by a first supporting hardware fixing hole 109. Elongate mounting hardware 103 has the second attachment portion situated at the other end 110 at the pair of opposite side portions 107 and having a portion having an elongate hole represented by a second supporting hardware fixing hole 112. Furthermore, elongate mounting hardware 103 has a top surface having a slot 113 for attaching a lateral frame to traverse the longitudinal direction of elongate mounting hardware 103.

The first attachment portion has first supporting hardware fixing hole 109, at which the supporting member or elongate mounting hardware 103 is connected to one of the fixing members or one supporting hardware 101 at the fixing portion by means of the round fixing hole or drawn tap 106 pivotably relative to one supporting hardware 101 with a direction perpendicular to side portion 107 serving as an axis of pivotation. Furthermore the second attachment portion has second supporting hardware fixing hole 112, at which the supporting member or elongate mounting hardware 103 is connected to the other one of the fixing members or the other supporting hardware 102 at the fixing portion by means of the round fixing hole or drawn tap 106 with a securing member represented by a bolt 111.

More specifically, one supporting hardware 101 and elongate mounting hardware 103 are arranged such that side portion 105 and side portion 107 have an outer surface and an inner surface, respectively, facing each other preferably in contact with each other, and bolt 104 is inserted through first supporting hardware fixing hole 109 and screwed into drawn tap 106 of one supporting hardware 101. Elongate mounting hardware 103 is thus supported axially by bolt 104 inserted through first supporting hardware fixing hole 109 and drawn tap 106. The direction in which bolt 104 serving as the axis of pivotation is inserted is only required to be substantially perpendicular to a plane including side portion 107 of the elongate mounting hardware. This is done at the opposite side portions of elongate mounting hardware 103 so that elongate mounting hardware 103 is supported pivotably around bolt 104 relative to one supporting hardware 101. Furthermore, one supporting hardware 101 and elongate mounting hardware 103 may be formed to abut against each other. For example, it is preferable that one supporting hardware 101 have side portion 105 having an upper portion partially cut off in the form of an arc to provide a top end portion, and that the top end portion and an internal back surface of elongate mounting hardware 103, i.e., an inner surface of the top side of elongate mounting hardware 103, i.e., that surface of the side having slot 113 which faces a surface of a roof when mounted on the roof, partially abut against each other to avoid preventing one supporting hardware 101 and elongate mounting hardware 103 from pivoting relative to each other. This partial abutment allows one supporting hardware 101 to support elongate mounting hardware 103 at both bolt 104 and the abutting portion to achieve firmer attachment. Furthermore, as one supporting hardware 101 and elongate mounting hardware 103 are only required to be connected pivotably relative to each other, bolt 104 may be replaced by: inserting a pin for axial support; fitting a protrusion defined at side portion 107 of the elongate mounting hardware into a recess defined at side portion 105 of the supporting hardware; or the like.

Furthermore, the other supporting hardware 102 and elongate mounting hardware 103 are arranged such that side portion 105 and side portion 107 have an outer surface and an inner surface, respectively, facing each other preferably in contact with each other, and the securing member or bolt 111 is inserted through second supporting hardware fixing hole 112 and screwed into drawn tap 106 of the other supporting hardware 102. Second supporting hardware fixing hole 112 is an elongate hole extending in the longitudinal direction of elongate mounting hardware 103, and bolt 111 can be inserted through second supporting hardware fixing hole 112 at a desired position within the range of the elongate hole or second supporting hardware fixing hole 112. In other words, second supporting hardware fixing hole 112 can provide a plurality of positions allowing the securing member or bolt 111 to secure elongate mounting hardware 103 to the other supporting hardware 102 so that a position allowing the other supporting hardware 102 and elongate mounting hardware 103 to be best arranged and secured together can be selected as desired from the plurality of positions to secure and thus fix the other supporting hardware 102 and elongate mounting hardware 103 together. This is done at the opposite sides of elongate mounting hardware 103 to fix elongate mounting hardware 103 to the other supporting hardware 102 within the range of second supporting hardware fixing hole 112. Preferably the other supporting hardware 102 and elongate mounting hardware 103 closely contact each other. Furthermore, preferably, the other supporting hardware 102 and elongate mounting hardware 103 are sandwiched by a detachably attachable member, such as bolt 111 and drawn tap 106 as shown in FIG. 1, and thus connected and fixed together. Furthermore, the position allowing the other supporting hardware 102 and elongate mounting hardware 103 to be best arranged and secured together is only required to be selected from the plurality of positions that the second attachment portion has. Accordingly, second supporting hardware fixing hole 112 may be inclined relative to the longitudinal direction of elongate mounting hardware 103. Alternatively, the second attachment portion may have a portion having a plurality of round holes, a curved elongate hole, or a plurality of elongate holes parallel to or traversing each other.

Figure 2:
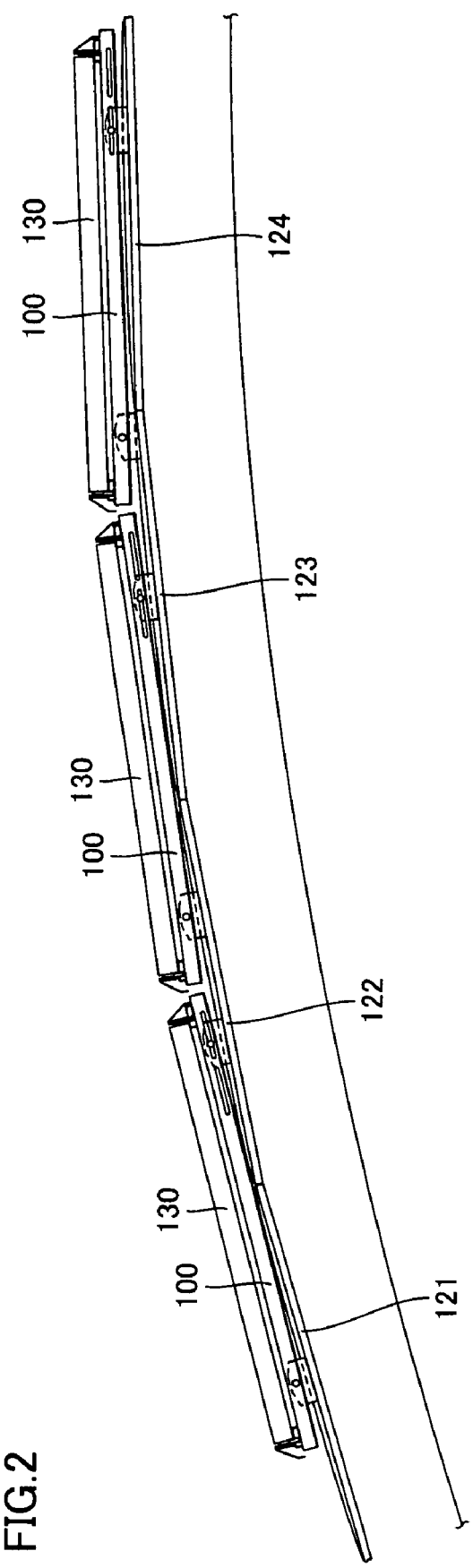
FIG. 2 schematically shows an embodiment of providing a plurality of structure mounting and supporting devices of FIG. 1 on a top surface of a roof.

Hereinafter will be described an example of employing structure mounting and supporting device 100 to mount a structure on a top surface of a roof having a plurality of pieces of sheathing inclined at different angles. FIG. 2 shows an example of providing structure mounting and supporting device 100 on a domed roof having an arcuate geometry as pieces of sheathing are inclined relative to a horizontal plane at an angle varying by a constant angle. In FIG. 2, pieces of sheathing 121-124 are arranged successively from the eave toward the top in the direction of the tilt of the roof. Pieces of sheathing 121-124 can for example be those having a dimension of 910 mm in the direction of the tilt of the roof, and a dimension of 1,820 mm in a direction orthogonal to the direction of the tilt of the roof, i.e., the direction of the ridge. Pieces of sheathing 121-124 each inclines at an angle reduced for example by 5° relative to the horizontal plane, as seen toward the top of the roof. In FIG. 2 on pieces of sheathing 121-124 three structure mounting and supporting devices 100 are arranged in the direction of the tilt of the roof. Structure mounting and supporting device 100 can for example be that having a longitudinal dimension of 1,085 mm. Structure mounting and supporting devices 100 are spaced from each other. Each structure mounting and supporting device 100 bears a structure represented by a panel 130, e.g., a solar cell module, set and fixed thereto. Hereinafter the three structure mounting and supporting devices 100 will be referred to as the structure mounting and supporting devices of first, second and third rows, as seen from the eaves toward the top in the direction of the tilt of the roof.

Figure 3:
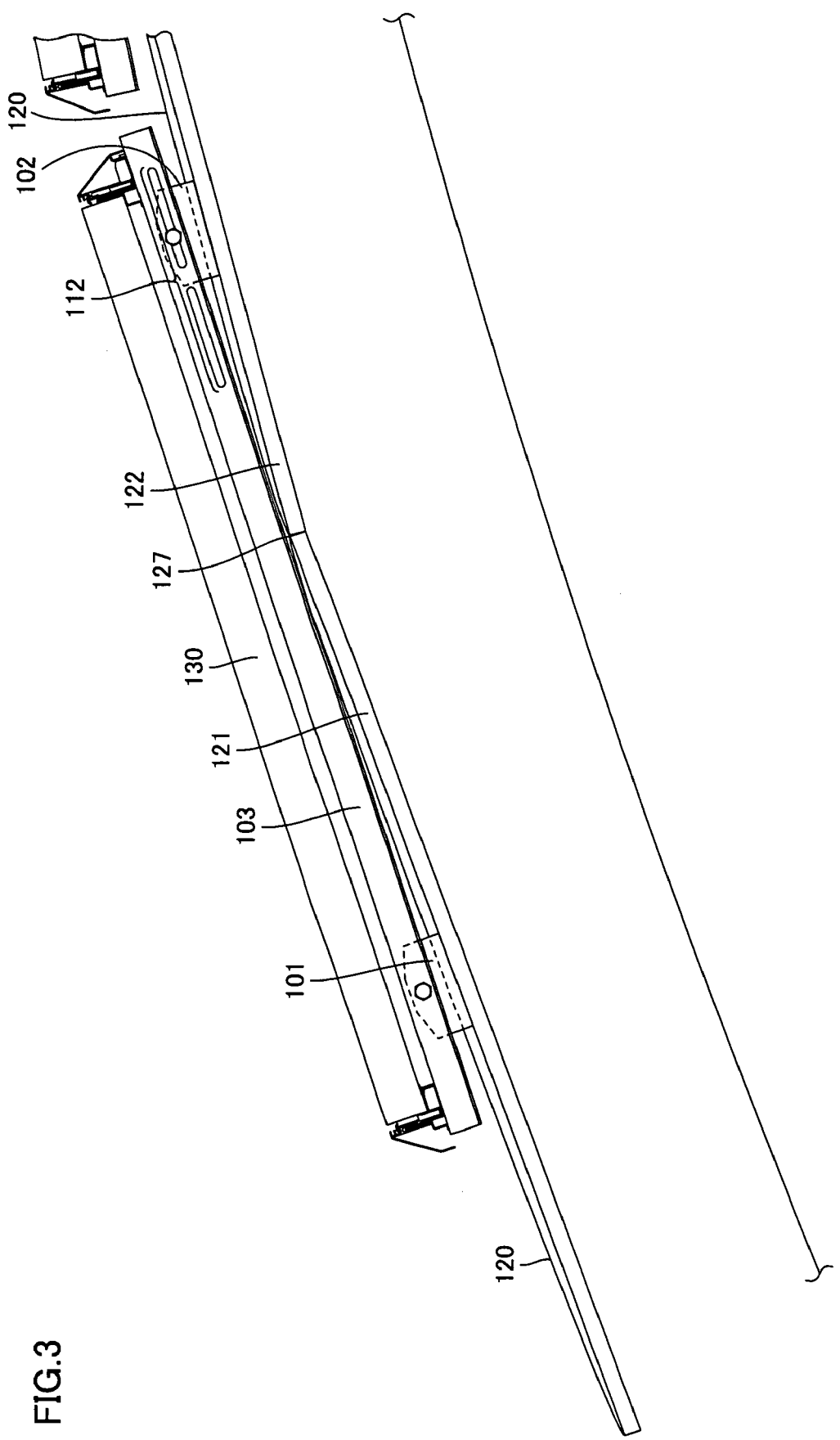
FIGS. 3 and 4 schematically show the structure mounting and supporting device in the first and second rows, respectively, shown in FIG. 2.
Figure 4:
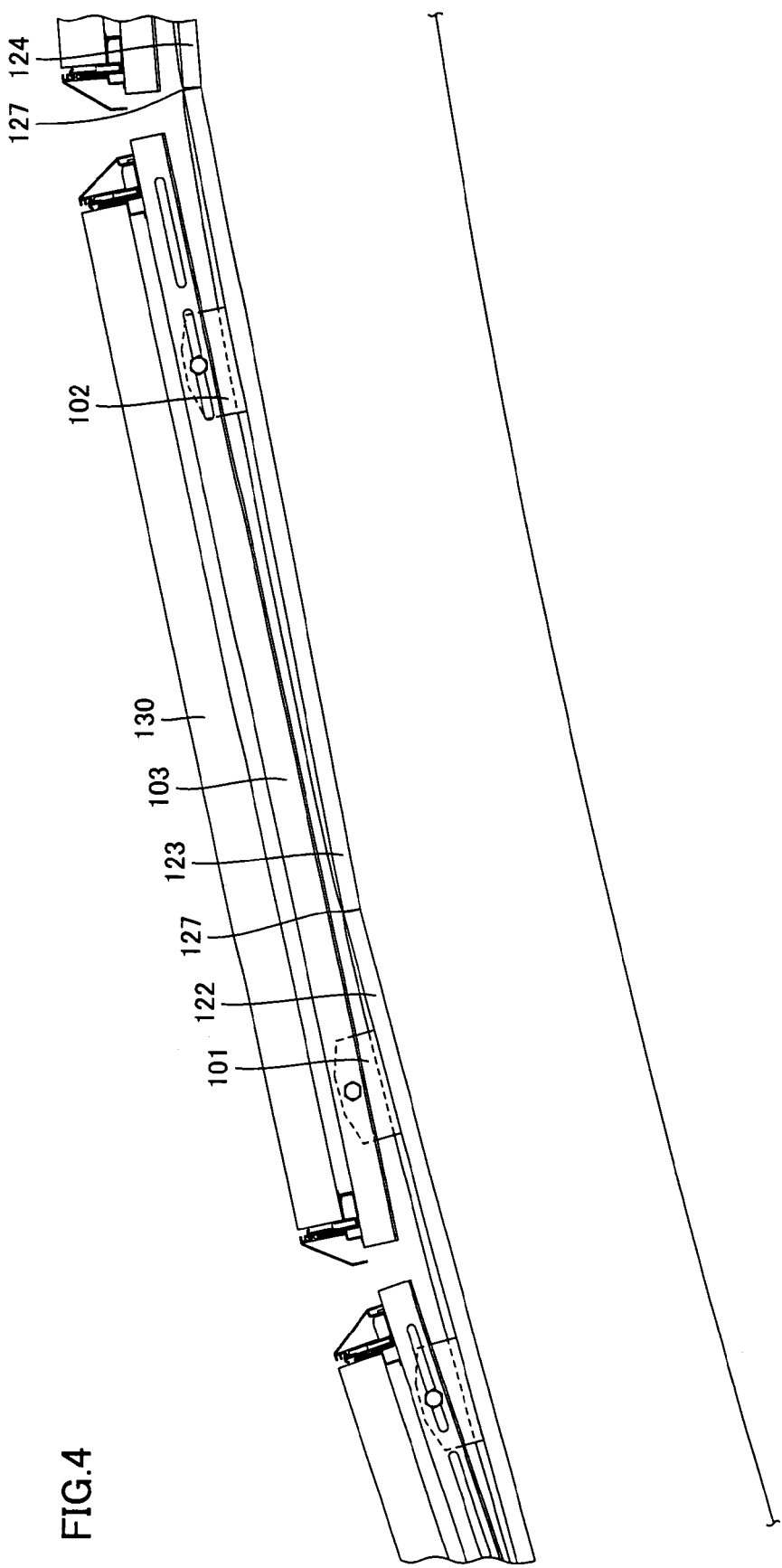

In FIG. 3 one of the fixing members or one supporting hardware 101 is fixed to piece of sheathing 121 perpendicularly. Furthermore, the other of the fixing members or the other supporting hardware 102 is fixed to piece of sheathing 122 perpendicularly. Note that piece of sheathing 122 inclines at an angle different from that of piece of sheathing 121. A roofing material 120 having a curved surface and serving as a facing of the roof is supported by the sheathing and provides a curved roof surface. Roofing material 120 can be formed for example of metal. Roofing material 120 has a through hole formed at a position at which one supporting hardware 101 is fixed to piece of sheathing 121. The through hole is formed for example by a bolt or a similar member used to fix one supporting hardware 101 to piece of sheathing 121. The through hole is also provided at a position at which the other supporting hardware 102 is fixed to piece of sheathing 122. The supporting member or elongate mounting hardware 103 is carried by the plurality of fixing members, i.e., one supporting hardware 101 and the other supporting hardware 102, and fixes and supports a structure or panel 130. Elongate mounting hardware 103 has a portion having second supporting hardware fixing hole 112, which is an elongate hole extending in the longitudinal direction of elongate mounting hardware 103. More specifically, second supporting hardware fixing hole 112 is formed to be elongate laterally in a direction substantially parallel to the sheathing. This allows the other supporting hardware 102 to be fixed to a surface or the sheathing at a position selected as desired. This can facilitate fixing the other supporting hardware 102 to the sheathing so as to avoid a top portion 127 of a seam of the underlying sheathing. Elongate mounting hardware 103 that has a plurality of second attachment portions, i.e., a plurality of second supporting hardware fixing holes 112, allows any position on the surface of the sheathing to be selected, as desired more than conventional, to fix the other supporting hardware 102 and facilitate fixing the other supporting hardware 102 to the sheathing so as to avoid top portion 127 of a seam of the sheathing. For example, in FIG. 3, of two second supporting hardware fixing holes 112 provided in the longitudinal direction of elongate mounting hardware 103, one adjacent to an end of elongate mounting hardware 103 is used. Furthermore, in FIG. 4, second supporting hardware fixing hole 112 closer to the center of elongate mounting hardware 103 is used.

A fixing member, i.e., one supporting hardware 101 and the other supporting hardware 102, that fixes a base can be fixed in a direction perpendicular to the sheathing underlying the roof material, while one supporting hardware 101 and the other supporting hardware 102 can be fixed to a supporting member i.e., elongate mounting hardware 103, serving as a portion of the base, at side portion 105 of the supporting hardware and side portion 107 of the elongate mounting hardware. Elongate mounting hardware 103 has first supporting hardware fixing hole 109 that is in the form of a round circle and second supporting hardware fixing hole 112 that is in the form of an elongate circle. This allows the supporting member that is carried by the plurality of fixing members to have one end initially connected to one fixing member and thus have the other end pivotable to provide a position at which the other fixing member and the supporting member are secured together with a degree of freedom to set and fix the fixing member and the supporting member. More specifically, first supporting hardware fixing hole 109 can initially be connected to the round drawn tap 106 of one supporting hardware 101 and thus positioned, and thereafter the position at which second supporting hardware fixing hole 112 and drawn tap 106 of the other supporting hardware 102 are connected can be adjusted and at that position the other supporting hardware 102 and elongate mounting hardware 103 can be secured together. This can facilitate mounting structure mounting and supporting device 100 on a top surface of a roof and thus improve its installability. Furthermore, one supporting hardware 101 and the other supporting hardware 102 and elongate mounting hardware 103 are connected at their respective side portions. As such, they can be readily connected together if one supporting hardware 101 and the other supporting hardware 102 do not have their respective top surfaces flush with each other. This can facilitate mounting structure mounting and supporting device 100 on a roof having a curved surface. This in turn allows a solar cell module to be applied to the roof having the curved surface. In addition, the other supporting hardware 102 can be fixed to the sheathing at a position selected as desired, and a gap formed between the sheathing's seam, or top portion 127, and elongate mounting hardware 103 can thus be adjusted. This allows panel 130 to be mounted along the curved surface of the roof and thus appear to be integrated with the roof and as a result appear more aesthetically. Furthermore, first supporting hardware fixing hole 109 can serve as a reference to adjust an angle at which panel 130 is mounted, to set a gap between the curved surface of the roof and panel 130 to be small to allow the structure to be mounted to be more resistant to wind pressure and thus more wind resistant.

FIGS. 2 and 3 show elongate mounting hardware 103 having a portion with an attachment hole or first supporting hardware fixing hole 109 and a portion with an elongate hole or second supporting hardware fixing hole 112. However, it is not limited to such geometry; the supporting member and fixing member that the structure mounting and supporting device has are only required to be connected at their respective side portions pivotably relative to each other, and the structure mounting and supporting device can be readily mounted on a roof having a curved surface. More specifically, the fixing member is only required to have a fixing portion fixing the supporting member to the side portion of the fixing member. The supporting member is only required to be fixed at a side portion thereof by the fixing member. The plurality of fixing members is only required to be pivotable relative to the supporting member with the fixing portion serving as an axis of pivotation such that a direction perpendicular to the side portion of the supporting member is that of the axis of pivotation. Thus one fixing member can be fixed to first sheathing perpendicularly and the other fixing member can be fixed to second sheathing, which is inclined at an angle different from that of the first sheathing, perpendicularly, and then the supporting member and one fixing member can be connected together and the supporting member and the other fixing member connected together to thus set and fix the supporting member. For example, the supporting member can be formed to have a portion fixed by the fixing member, or the first attachment portion and the second attachment portion, each having a portion provided with a round hole. Alternatively, the supporting member can be formed to have the first attachment portion and the second attachment portion each having a portion provided with an elongate hole. To select as desired a position at which the fixing member is fixed to the sheathing, however, it is preferable that the supporting member have the portion having the elongate hole.

Structure mounting and supporting device 100 is configured of components structured as will be described hereinafter. Elongate mounting hardware 103 is formed in the form of the letter U with an outward flange, as shown in FIG. 5C showing a side view thereof. FIG. 5B is a front view, which shows the elongate mounting hardware's side portion 107 with first supporting hardware fixing hole 109 and second supporting hardware fixing hole 112. FIG. 5A is a plan view, which shows a top surface with slot 113 for attaching a lateral frame. Elongate mounting hardware 103 can be produced by press-molding a plate of metal in a die. Alternatively, it can be produced by roll-forming the plate of metal or extrusion-molding it. Preferably the plate of metal is highly anticorrosive as structure mounting and supporting device 100 is installed outdoor. For example, it can be Super Dyma® of Nippon Steel Corporation, or similar zinc plated steel, stainless steel, aluminum alloy or the like.

Figure 6A:
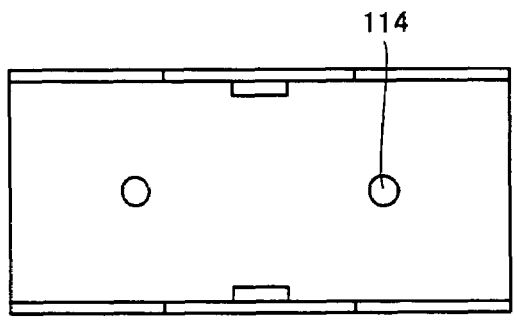
FIGS. 6A-6C are plan, front and side views, respectively, of a fixing member shown in FIG. 1.
Figure 6C:
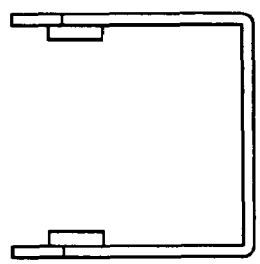
Figure 6B:
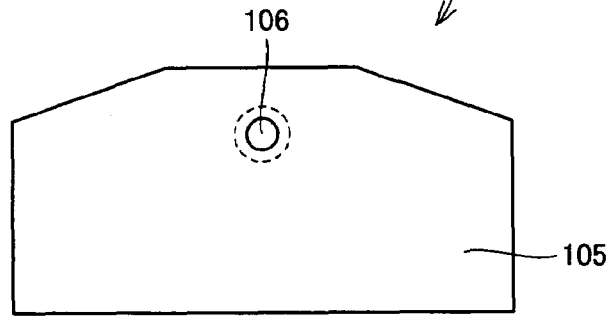

FIG. 6A is a plan view, which shows one supporting hardware 101 and the other supporting hardware 102 having a bottom surface, i.e., a surface that contacts the sheathing, with two screw holes 114 for fixing one supporting hardware 101 and the other supporting hardware 102 to the sheathing. FIG. 6B is a front view, which shows the supporting hardware's side portion 105 with a drawn hole having an internal side threaded to provide drawn tap 106. Furthermore, the supporting hardware's side portion 105 has an upper portion partially cut off so that when supporting hardware 101 and the other supporting hardware 102 are attached to elongate mounting hardware 103 one supporting hardware 101 and the other supporting hardware 102 do not have their upper portions interfering with the top surface of elongate mounting hardware 103 and thus preventing one supporting hardware 101 and the other supporting hardware 102 and elongate mounting hardware 103 from pivoting relative to each other. Furthermore, the distance from the top surface of the supporting hardware's side portion 105 to drawn tap 106 is defined to be smaller than that from the top end of the internal side of side portion 107 of the elongate mounting hardware to first supporting hardware fixing hole 109 and second supporting hardware fixing hole 112. Thus, elongate mounting hardware 103 can be supported pivotably within a determined range around bolt 104 connecting drawn tap 106 and first supporting hardware fixing hole 109 together. The supporting hardware's side portion 105 is not limited in geometry to that shown in FIG. 6B and may have any geometry that allows elongate mounting hardware 103 to be supported pivotably within the determined range. For example, the supporting hardware's side 105 can have an upper portion in the form of an arc providing a curved top portion.

Figure 7A:
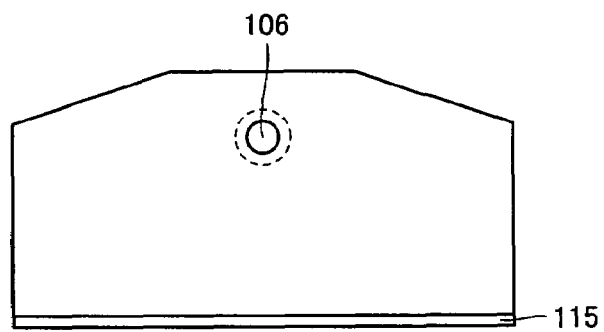
FIGS. 7A and 7B are front and side views, respectively, of an exemplary variation of the fixing member shown in FIG. 1.
Figure 7B:
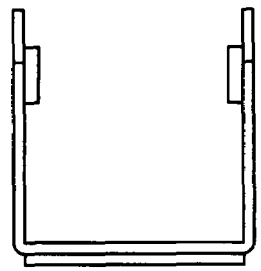

FIG. 7A shows one supporting hardware 101 and the other supporting hardware 102 in an exemplary variation in a front view, showing the fixing member having a bottom side, i.e., a side adjacent to the sheathing, with an external surface, i.e., a surface adjacent to the sheathing, having a water-shutoff member 115 bonded thereon to shut off water from a portion tapped to fix one supporting hardware 101 and the other supporting hardware 102 to the sheathing. Water-shutoff member 115 can be in the form of a plate, as shown in FIG. 7B, and in that case, preferably, it is formed to be slightly smaller than the bottom side. Water-shutoff member 115 may be formed of any material that can be pressed by screwing the fixing member to the sheathing to shut off water from the portion tapped to fix one supporting hardware 101 and the other supporting hardware 102 to the sheathing. For example it can be formed of butyl rubber, foamed ethylene-propylene terpolymer (EPDM) rubber, and the like.

Figure 8:
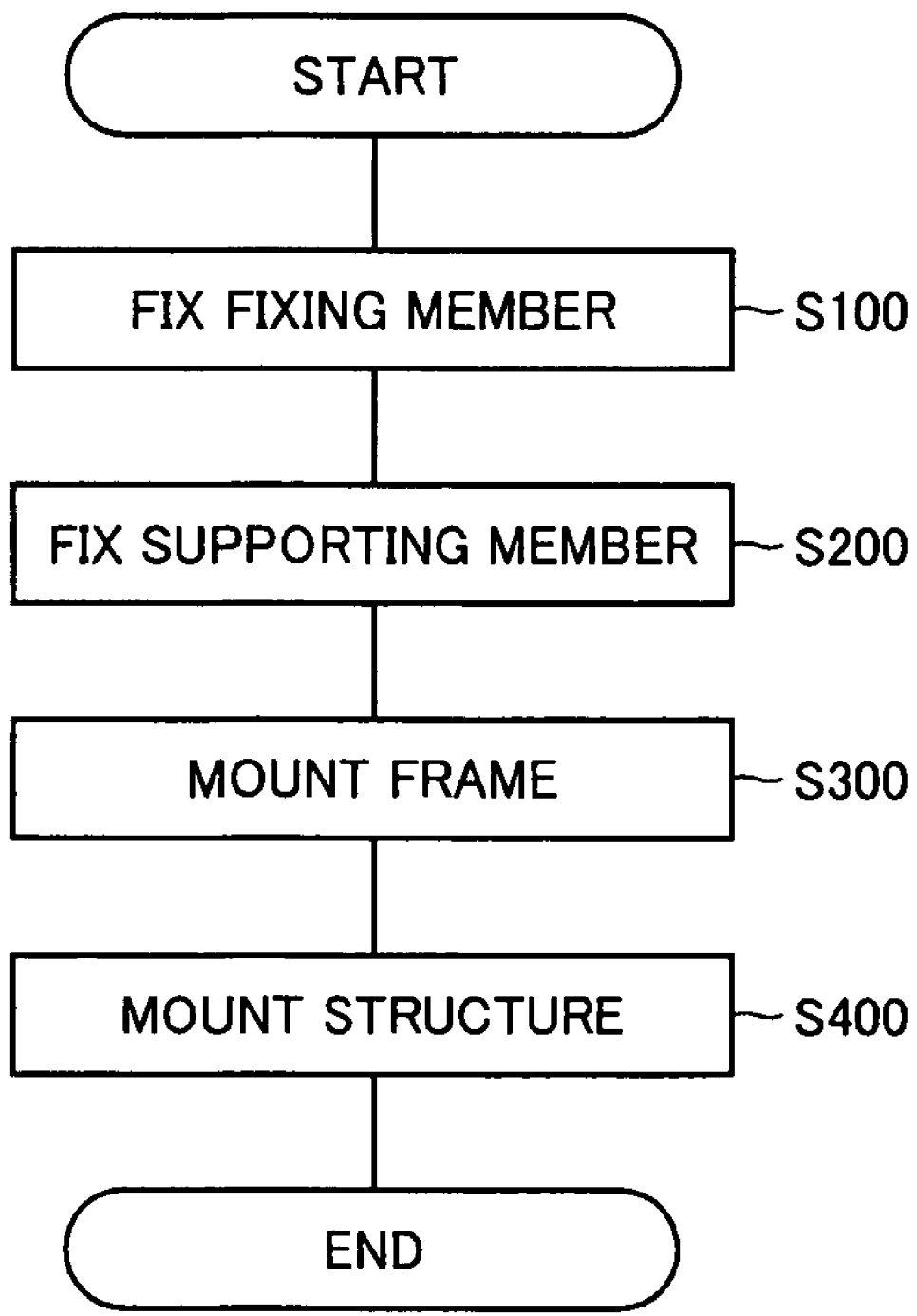
FIG. 8 is a flowchart schematically representing a method of mounting and supporting a structure.

Hereinafter a method of mounting and supporting a structure will be described. With reference to FIG. 8, structure mounting and supporting device 100 is employed in the method to mount a structure on a top surface of a roof having a plurality of pieces of sheathing inclined at different angles.

Initially at step S100 a plurality of fixing members are fixed to the sheathing. In this step, one supporting hardware 101 and the other supporting hardware 102 and elongate mounting hardware 103 are temporarily assembled together and thus positioned on a surface of a roof in the direction of the tilt of the roof while avoiding a seam of the sheathing, or top portion 127. Then a position at which one supporting hardware 101 and the other supporting hardware 102 are set is marked in the direction of the tilt of the roof. Then the position of an elongate hole of a lateral frame fixed to elongate mounting hardware 103 is confirmed and that elongate mounting hardware 103 and the lateral frame are set at a position allowing them to be fixed together is confirmed, and then a marking is done in a direction perpendicular to the direction of the tilt of the roof, i.e., the direction of the ridge, in accordance with a dimension of the structure such as solar cell module as seen in the director of the ridge. Then one supporting hardware 101 and the other supporting hardware 102 are placed at intersections of the marking lines extending in the two directions, and screwed to the sheathing perpendicularly.

Then at step S200 the supporting member is fixed to the plurality of fixing members. This step will be described later more specifically. Then at step S300 a frame is mounted on a plurality of supporting members. In this step, for example, tap hardware is slid and thus inserted into slot 113, which is in the form of the letter T, of elongate mounting hardware 103 fixed by one supporting hardware 101 and the other supporting hardware 102. On the tap hardware the lateral frame is placed and that the elongate hole of the lateral frame is positioned over slot 113 is confirmed, and the lateral frame is secured to slot 113 with a bolt and thus mounted. Elongate mounting hardware 103 shown in FIGS. 1 and 5A has two slots 113, and preferably, a lateral frame closer to the eaves is initially attached. After the lateral frame closer to the eaves is mounted, a cover may also be attached to the lateral frame closer to the eaves.

Then at step S400 the structure is mounted on frames and supported. In this step, for example, the structure is a solar cell module and it is temporarily set to incline relative to a surface of the sheathing to engage with the lateral frame closer to the eaves. The solar cell module is then moved to have a surface parallel to that of the sheathing and a side of the module is engaged with a lateral frame closer to the ridge to fix the module. After the module is fixed, a cover may also be attached to the lateral frame closer to the ridge. This procedure can be repeated to arrange and thus mount such structures on the top surface of the roof.

Figure 9:
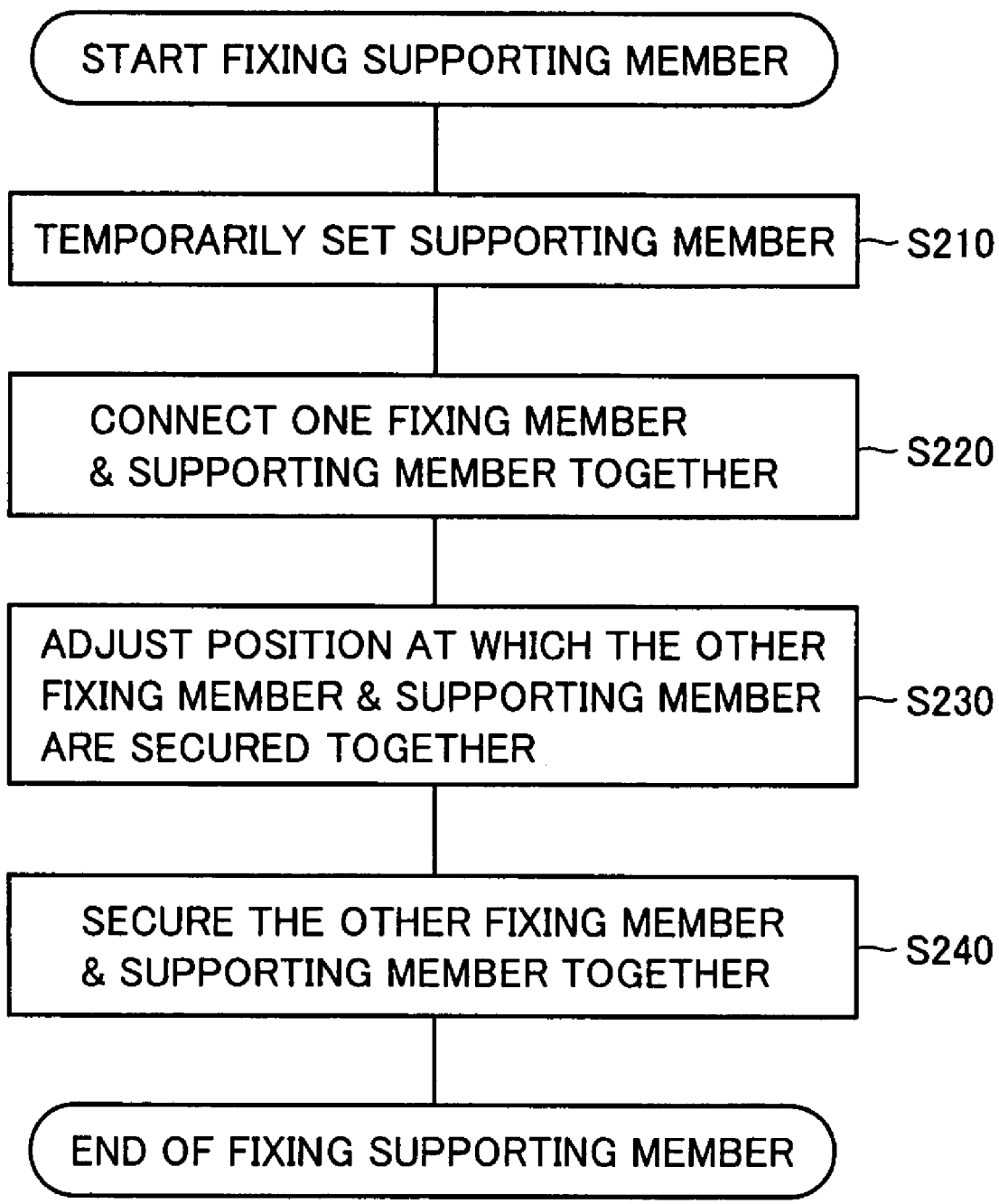
FIG. 9 is a flowchart specifically indicating the step of fixing the supporting member in the method of mounting and supporting a structure shown in FIG. 8.

With reference to FIG. 9 the step of fixing the supporting member to the plurality of fixing members (S200) will be described. Initially at step S210 the supporting member is temporarily placed such that it is mounted on the plurality of fixing members fixed to the sheathing. More specifically, elongate mounting hardware 103 is temporarily placed on one supporting hardware 101 and the other supporting hardware 102 fixed to the sheathing. In doing so, elongate mounting hardware 103 is set to have one end 108 closer to the eaves.

Then at step S220 one fixing member and the supporting member are connected together. More specifically, drawn tap 106 of side portion 105 of one supporting hardware 101 and first supporting hardware fixing hole 109 of one end 108 of side portion 107 of elongate mounting hardware 103 are connected together. Drawn tap 106 and first supporting hardware fixing hole 109 can be fixed together with bolt 104. Thus one of the plurality of fixing members, or one supporting hardware 101, and the supporting member or elongate mounting hardware 103 can be connected together pivotably relative to each other such that a direction perpendicular to the elongate mounting hardware's side portion 107 serves as an axis of pivotation.

Then at step S230 the position at which the other fixing member and the supporting member are secured together is adjusted. More specifically, a position at which the round drawn tap 106 of side portion 105 of the other supporting hardware 102 is secured is adjusted relative to the elongate, second supporting hardware fixing hole 112 of the other end 110 of side portion 107 of elongate mounting hardware 103. Second supporting hardware fixing hole 112 is an elongate hole extending in the longitudinal direction of elongate mounting hardware 103. More specifically, second supporting hardware fixing hole 112 is formed to be elongate laterally in a direction parallel to the sheathing. Second supporting hardware fixing hole 112 that is elongate and thus has a range can thus provide a range to the position at which the other supporting hardware 102 and elongate mounting hardware 103 are secured together.

Then at step S240 the other fixing member and the supporting member are secured together. More specifically, bolt 111 is inserted through the elongate, second supporting hardware fixing hole 112 of the other end 110 of the elongate mounting hardware's side 107 and screwed into drawn tap 106 of side portion 105 of the other supporting hardware 102 to secure the other supporting hardware 102 and elongate mounting hardware 103 together.

By the method of mounting and supporting a structure, as described above, a fixing member, i.e., one supporting hardware 101 and the other supporting hardware 102, that fixes a base can be fixed in a direction perpendicular to the sheathing underlying the roof material, while one supporting hardware 101 and the other supporting hardware 102 can be fixed to a supporting member i.e., elongate mounting hardware 103, serving as a portion of the base, at side portion 105 of the supporting hardware and side portion 107 of the elongate mounting hardware. First supporting hardware fixing hole 109 can initially be connected to the round drawn tap 106 of one supporting hardware 101 and thus positioned. The elongate mounting hardware thus has the other end 110 pivotably, and in that condition, the position at which second supporting hardware fixing hole 112 and drawn tap 106 of the other supporting hardware 102 are connected can be adjusted and at that position the other supporting hardware 102 and elongate mounting hardware 103 can be secured together. This can facilitate mounting structure mounting and supporting device 100 on a top surface of a roof and thus improve its installability. Furthermore, one supporting hardware 101 and the other supporting hardware 102 and elongate mounting hardware 103 are connected at their respective side portions. As such, they can be readily connected together even if one supporting hardware 101 and the other supporting hardware 102 do not have their respective top surfaces flush with each other. This can facilitate mounting structure mounting and supporting device 100 on a roof having a curved surface. In addition, the other supporting hardware 102 can be fixed to elongate mounting hardware 103 at a position selected as desired, and a gap formed between the sheathing's seam, or top portion 127, and elongate mounting hardware 103 can thus be adjusted. This allows panel 130 to be mounted along the curved surface of the roof and thus appear to be integrated with the roof and as a result appear more aesthetically. Furthermore, first supporting hardware fixing hole 109 can serve as a reference to adjust an angle at which panel 130 is mounted, to set a gap between the curved surface of the roof and panel 130 to be small to allow the structure to be mounted to be more resistant to wind pressure and thus more wind resistant.

Second Embodiment

Figure 10:
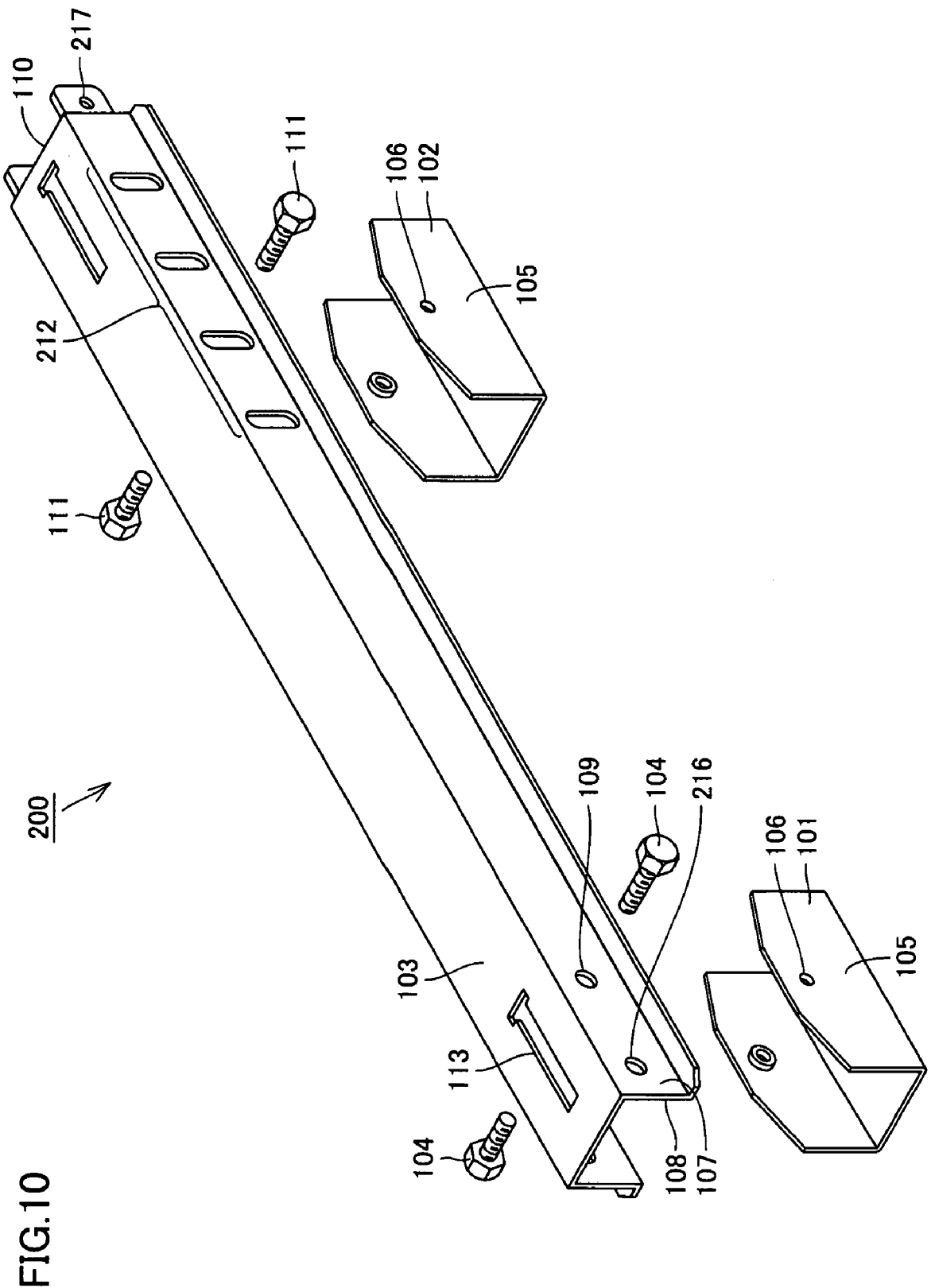
FIG. 10 is a perspective view of an external appearance of a structure mounting and supporting device of a second embodiment.

A second embodiment provides a structure mounting and supporting device basically similar in configuration to that of the first embodiment described above, except that the second embodiment differs from the first embodiment in that a second supporting hardware fixing hole 212 and a vicinity of each of one and the other ends 108 and 110 of the elongate mounting hardware are configured as shown in FIG. 10.

More specifically, in FIG. 10, a structure mounting and supporting device 200 includes a second attachment portion having a portion with an elongate hole represented by second supporting hardware fixing hole 212 extending in the direction of the shorter side of the side portion orthogonal to the longitudinal direction of elongate mounting hardware 103. The supporting member or elongate mounting hardware 103 has a joint provided at opposite ends as seen in the longitudinal direction for joining a plurality of elongate mounting hardware 103 in the longitudinal direction. More specifically, the elongate mounting hardware has one end 108 including a first joint 216 and the other end 110 including a second joint 217. More specifically, the elongate mounting hardware has first joint 216 defined at one end 108 in side portion 107 and having a portion with a round hole, and second joint 217 being a member in the form of a fin protruding at the other end 110 from side portion 107 and having a portion with a round hole. If a plurality of structure mounting and supporting devices 200 are successively mounted on a roof in the direction of the tilt of the roof, first joint 216 and second joint 217 can join and thus fix the plurality of structure mounting and supporting devices 200 together. For example, first joint 216 and second joint 217 can have their respective round holes threaded inside and thus connected with a bolt to join and thus fix the plurality of structure mounting and supporting devices 200.

Figure 11:
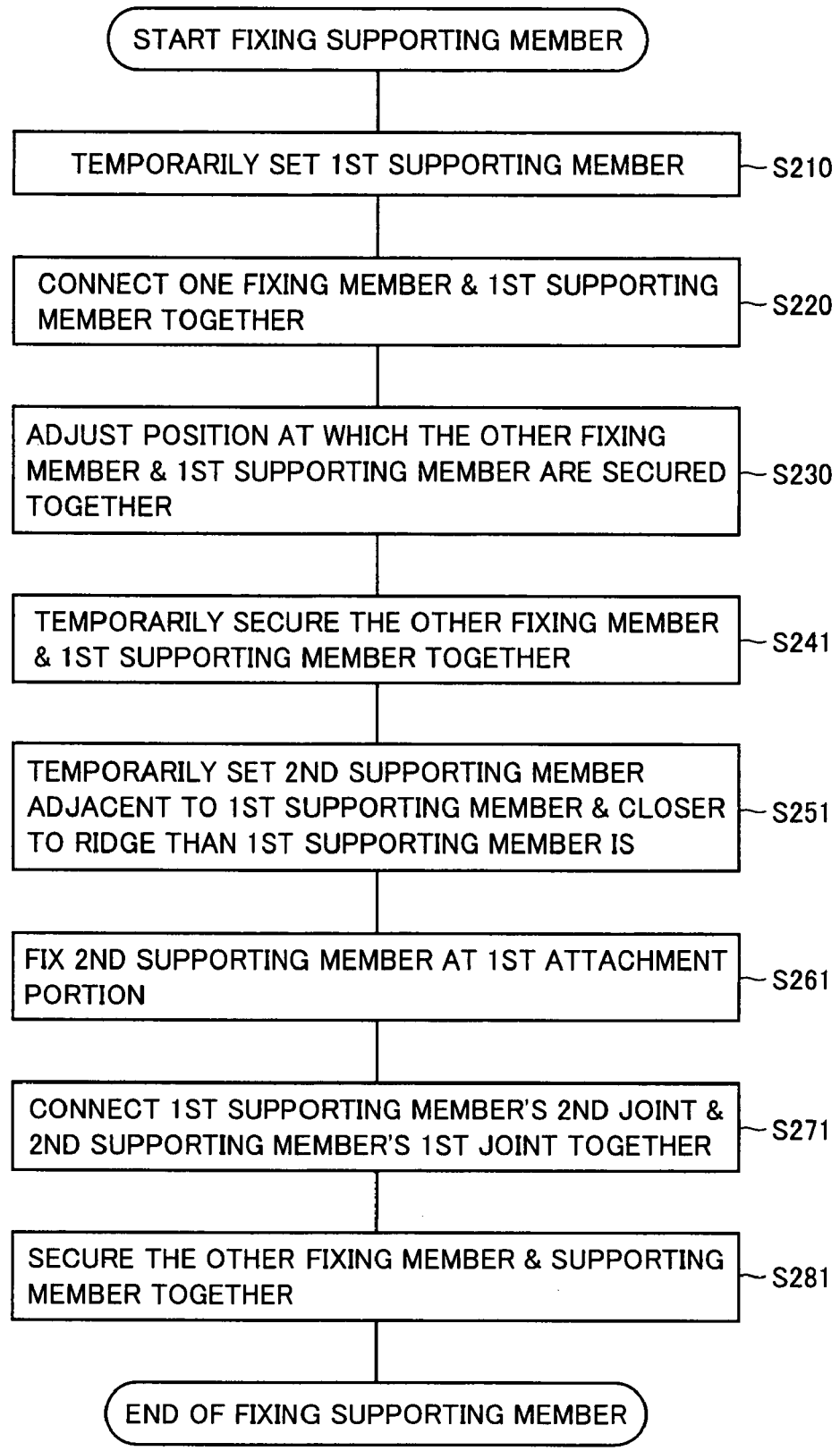
FIG. 11 is a flowchart specifically showing an exemplary variation of the step of fixing the supporting member.

The step of fixing the supporting member, as shown in FIG. 11, and that of FIG. 9 basically include similar steps, except that the former differs from the latter in that a step corresponding to step S240 of FIG. 9 is replaced with steps S241-S281 shown in FIG. 11.

More specifically, after step S230, i.e., after the position at which the other fixing member and a first supporting member are secured together is adjusted, they are not secured together immediately. Instead, step S241 is performed to temporarily fix them. More specifically, bolt 111 is inserted into second supporting hardware fixing hole 212 of elongate mounting hardware 103 and drawn tap 106 of the other supporting hardware 102 and temporarily, loosely tightened within the range of the elongate, second supporting hardware fixing hole 212.

Then at step S251 a second supporting member is temporarily placed at a position adjacent to the first supporting member and closer to the ridge than the first supporting member is, as seen in the direction of the tilt of the roof. Then step S261 is performed to fix the second supporting member at the first attachment portion. More specifically, a manner similar to steps S210 and S220 shown in FIG. 9 can be employed. Preferably, second joint 217 is curved inwards to prevent mutual interference of second joint 217 of elongate mounting hardware 103 of a first structure mounting and supporting device 200 and side portion 107 of elongate mounting hardware 103 of a second structure mounting and supporting device 200 adjacent to first structure mounting and supporting device 200 and closer to the ridge than first structure mounting and supporting device 200 is. Thus structure mounting and supporting devices 200 arranged adjacently in the direction of the tilt of the roof can be arranged such that an external side surface of second joint 217 of elongate mounting hardware 103 of first structure mounting and supporting device 200 and an internal side surface of side portion 107 of elongate mounting hardware 103 of second structure mounting and supporting device 200 arranged adjacent to first structure mounting and supporting device 200 and closer to the ridge than first structure mounting and supporting device 200 is can be opposite to each other.

Then at step S271 the first supporting member's second joint and the second supporting member's first joint are connected together. More specifically, second joint 217 of elongate mounting hardware 103 of first structure mounting and supporting device 200 and first joint 216 of elongate mounting hardware 103 of second structure mounting and supporting device 200 arranged adjacent to first structure mounting and supporting device 200 and closer to the ridge than first structure mounting and supporting device 200 is are bolted and thus screwed together, and thus joined and fixed together.

Then at step S281 the other fixing member and the supporting member are secured together. More specifically, the other supporting hardware 102 and elongate mounting hardware 103 are secured together with bolt 111 inserted through second supporting hardware fixing hole 212 of elongate mounting hardware 103 and drawn tap 106 of the other supporting hardware 102 and temporarily fixed at step S241.

The method of mounting and supporting a structure including the step of fixing the supporting member, as described above, allows a first supporting member and a second supporting member joined to the first supporting member adjacently and closer to the ridge than the first supporting member is to have a second joint closer to the ridge and a first joint closer to the eaves, respectively, for example bolted and thus connected and fixed together to provide a more wind pressure resistant structure mounting and supporting device. Furthermore, the structure of each row can be mounted uniformly and hence arranged neatly and hence more aesthetically. If the structure is a solar cell module it can be installed on a roof efficiently for its footprint and consequently generate more power.

Figure 12:
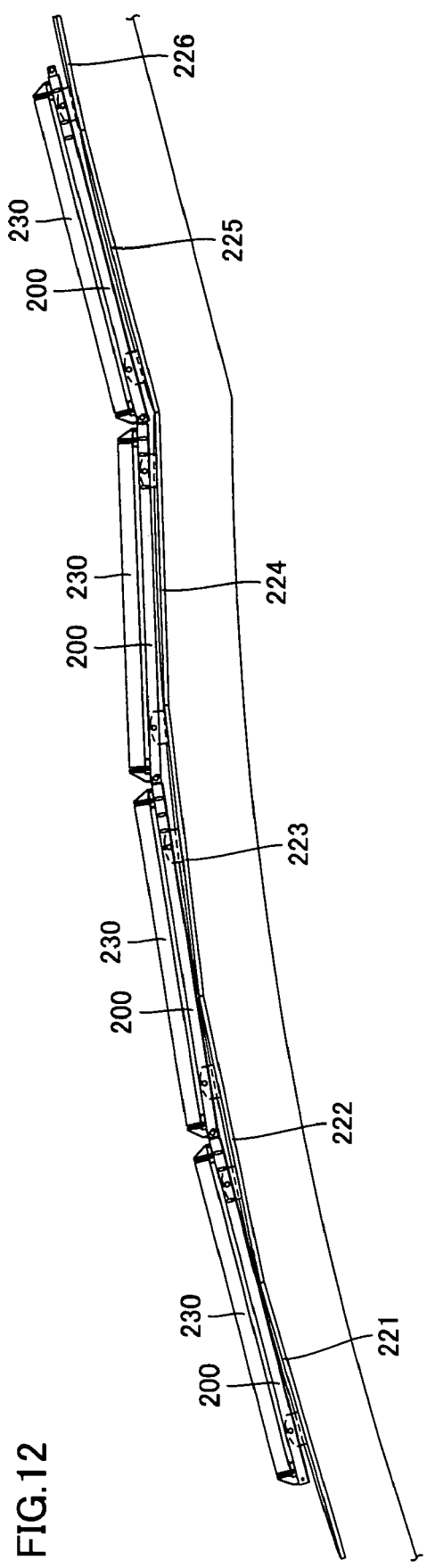
FIG. 12 schematically shows an embodiment of providing a plurality of structure mounting and supporting devices of FIG. 10 on a top surface of a roof.

Hereinafter will be described an example of employing structure mounting and supporting device 200 to mount a structure on a top surface of a roof having a plurality of pieces of sheathing inclined at different angles. FIG. 12 shows an example of providing structure mounting and supporting device 200 on a domed roof having an arcuate geometry as pieces of sheathing are inclined relative to a horizontal plane at an angle varying by a constant angle. In FIG. 12, pieces of sheathing 221-226 are arranged successively from the eaves toward the top in the direction of the tilt of the roof. Pieces of sheathing 221-226 can for example be those having a dimension of 910 mm in the direction of the tilt of the roof, and a dimension of 1,820 mm in a direction orthogonal to the direction of the tilt of the roof, i.e., the direction of the ridge. Pieces of sheathing 221-224 each inclines at an angle reduced for example by 5° relative to the horizontal plane, as seen toward the top of the roof. Pieces of sheathing 221-224 form an arcuate geometry and pieces of sheathing 225 and 226 form a different arcuate geometry. Pieces of sheathing 224 and 225 provide a seam in the form of a trough. In FIG. 12 on pieces of sheathing 221-226 four structure mounting and supporting devices 200 are arranged in the direction of the tilt of the roof. Structure mounting and supporting device 200 can for example be that having a longitudinal dimension of 1,085 mm. Each structure mounting and supporting device 200 is mutually joined. Each structure mounting and supporting device 200 bears a structure represented by a panel 230, e.g., a solar cell module, mounted thereon and fixed thereto. Hereinafter the four structure mounting and supporting devices 200 will be referred to as the structure mounting and supporting devices of first, second, third and fourth rows, as seen from the eaves toward the top in the direction of the tilt of the roof.

Figure 13:
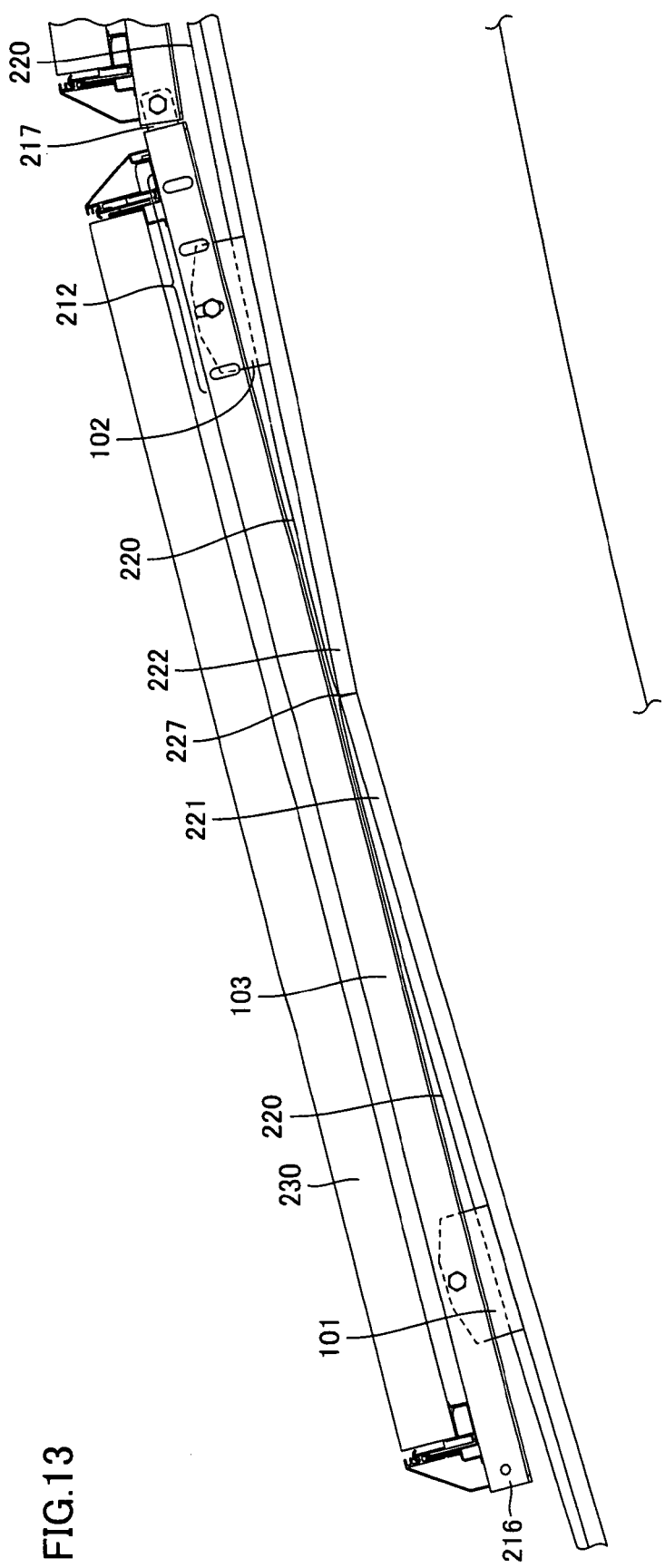
FIGS. 13-16 schematically show the structure mounting and supporting device in the first to fourth rows, respectively, shown in FIG. 12.

In FIG. 13 one fixing member or one supporting hardware 101 is fixed to piece of sheathing 221 perpendicularly. Furthermore, the other fixing member or the other supporting hardware 102 is fixed to piece of sheathing 222 perpendicularly. A roofing material 220 having a curved surface and serving as a facing of the roof is supported by the sheathing and provides a curved roof surface. The supporting member or elongate mounting hardware 103 is carried by the plurality of fixing members, i.e., one supporting hardware 101 and the other supporting hardware 102, and fixes and supports the structure or panel 230. Elongate mounting hardware 103 has second supporting hardware fixing hole 212, which is an elongate hole extending in the direction of the shorter side of the side portion orthogonal to the longitudinal direction of elongate mounting hardware 103. More specifically, second supporting hardware fixing hole 212 is formed to be elongate vertically in a direction substantially perpendicular to the sheathing. More than one second supporting hardware fixing hole 212 allows the other supporting hardware 102 to be fixed to a surface of the sheathing at a position selected as desired. This can facilitate fixing the other supporting hardware 102 to the sheathing so as to avoid a top portion 227 of a seam of the underlying sheathing. For example in FIG. 13 top portion 227 of the seam of the sheathing is located closer to the center of elongate mounting hardware 103. Accordingly, the other supporting hardware 102 and elongate mounting hardware 103 are secured together at a center of the elongate, second supporting hardware fixing hole 212.

Furthermore, structure mounting and supporting device 200 of the first row and that of the second row have second joint 217 and first joint 216, respectively, connected together to join structure mounting and supporting devices 200 of the first and second rows together. Thus a plurality of structure mounting and supporting devices 200 can be arranged on a roof uniformly. If the structure is a solar cell module it can be installed on the roof efficiently for its footprint and consequently generate more power. Furthermore, if the structure is mounted on a roof having a curved surface, the structure can be mounted along the curved surface. The structure can thus appear to be integrated with the roof and hence appear more aesthetically. Furthermore, structure mounting and supporting devices 200 integrally fixed together mutually enhance their respective resistances to wind.

Figure 14:
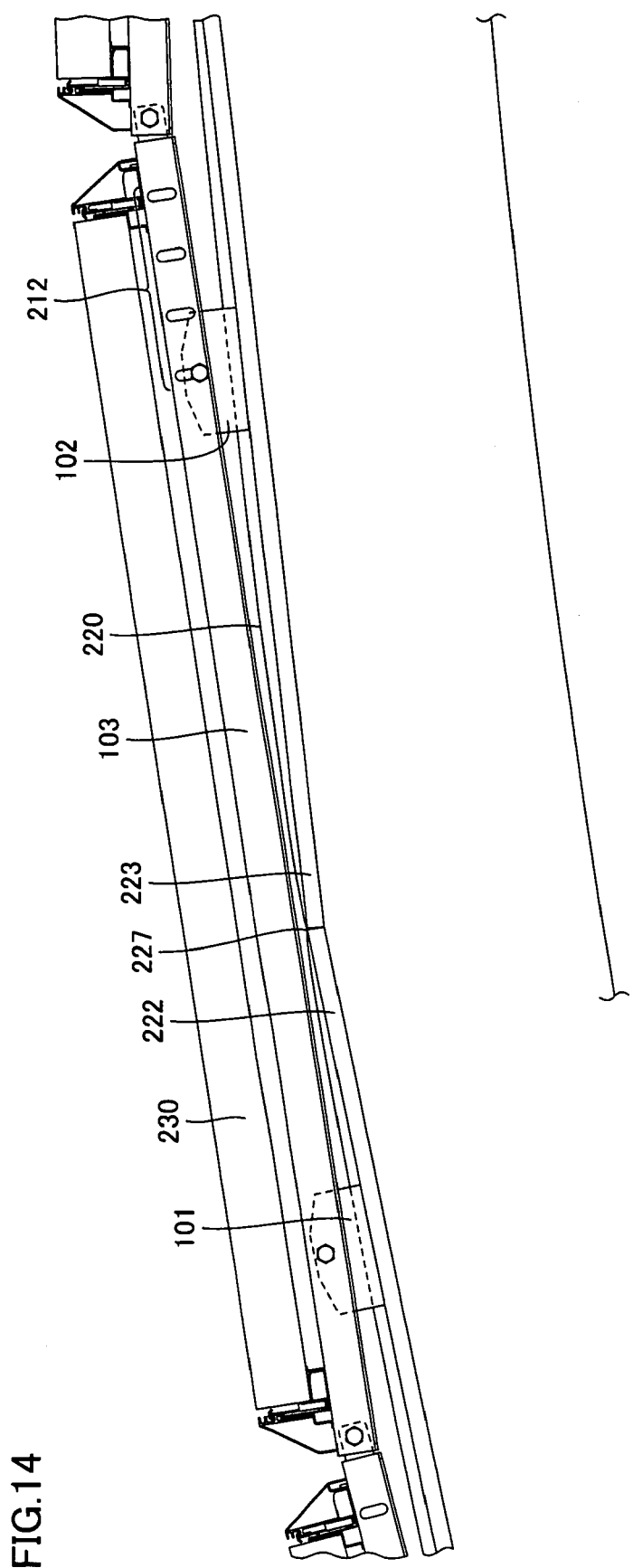

For structure mounting and supporting device 200 of the second row shown in FIG. 14, top portion 227 of a seam of the sheathing is closer to the eaves with reference to the center of elongate mounting hardware 103. Accordingly, of four second supporting hardware fixing holes 212 defined in elongate mounting hardware 103 in the longitudinal direction, one closest to the center of elongate mounting hardware 103 is used, and as second supporting hardware fixing hole 212 is formed to be vertically elongate, a portion thereof that is adjacent to the sheathing is used to secure the other supporting hardware 102 and elongate mounting hardware 103 together.

Figure 15:
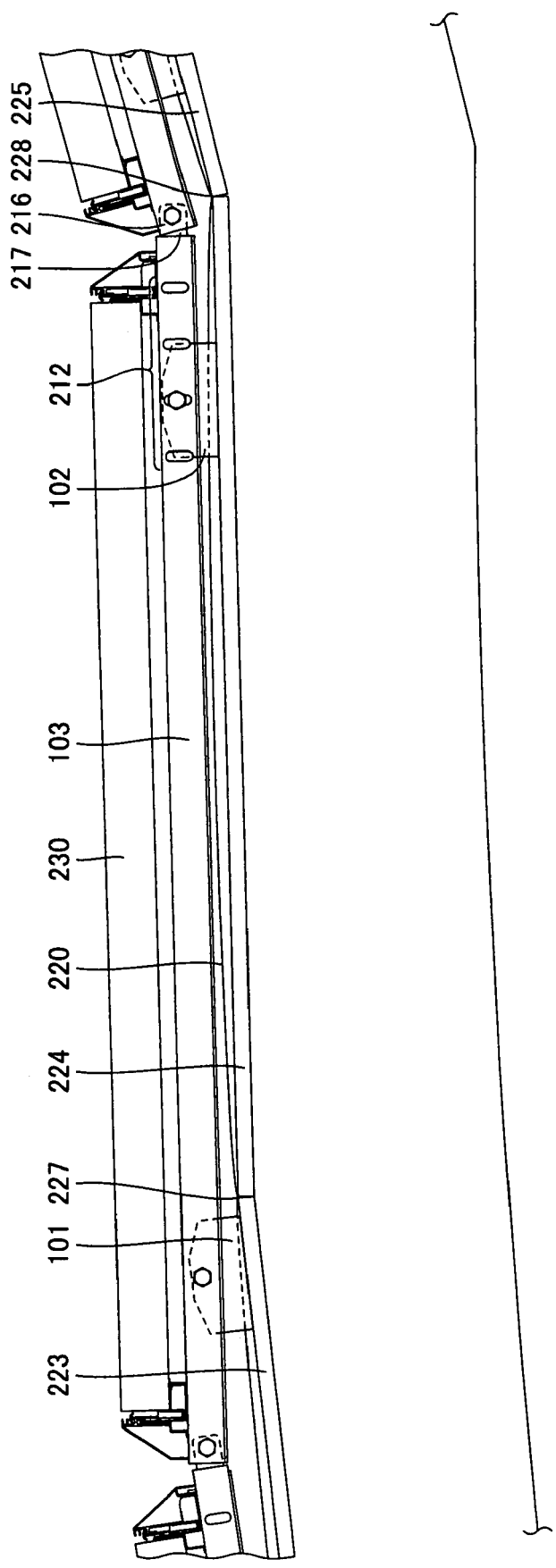
Figure 16:
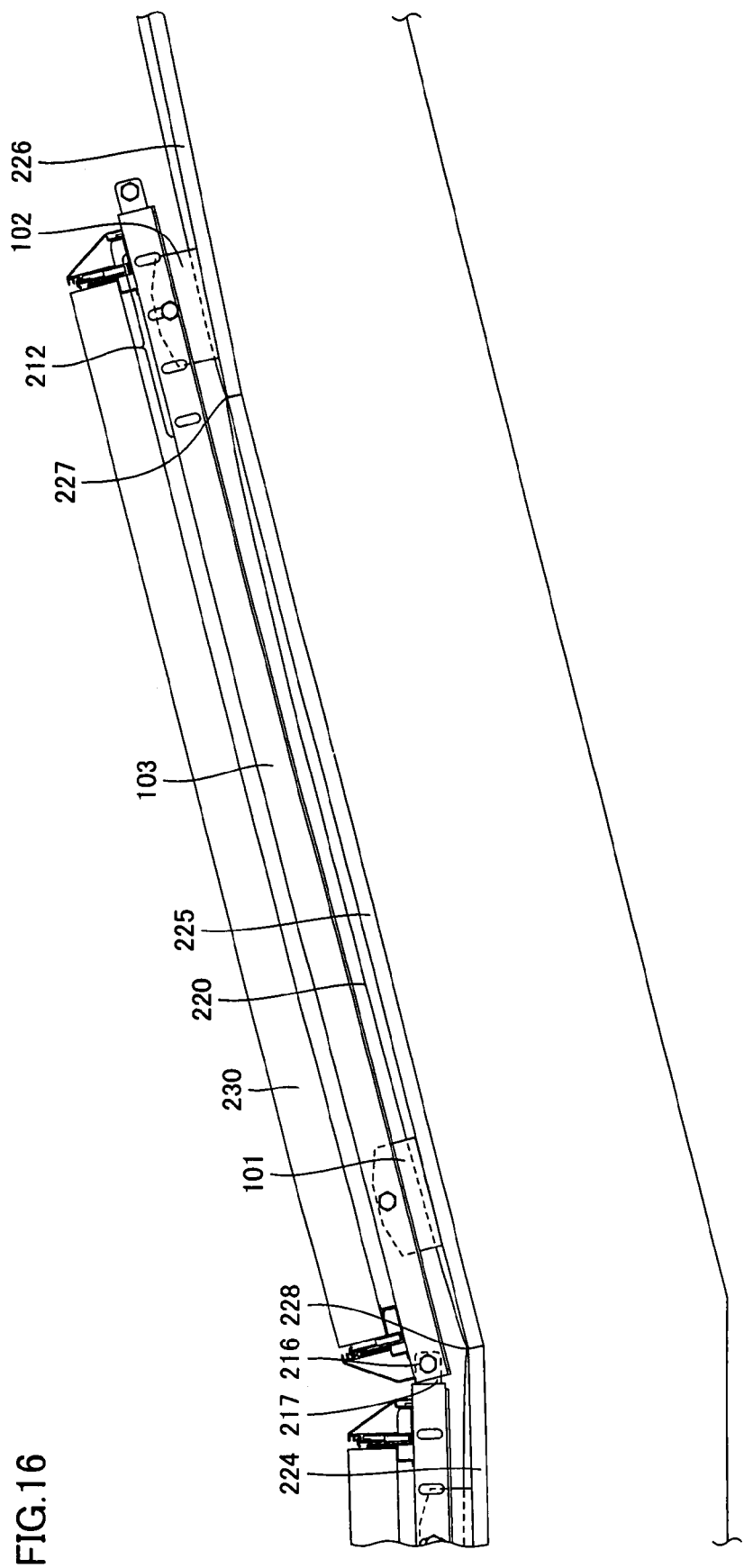

In FIG. 15 pieces of sheathing 224 and 225 having different arcs are shown with a seam closer to the ridge than structure mounting and supporting device 200 of the third row is. In FIG. 16 pieces of sheathing 224 and 225 having different arcs are shown with a seam closer to the eaves than structure mounting and supporting device 200 of the fourth row is. Structure mounting and supporting device 200 can facilitate adjusting a gap formed between a trough 228 of a seam of the sheathing and elongate mounting hardware 103, while structure mounting and supporting devices 200 of the third and forth rows can be joined together. More specifically the step of fixing the supporting member shown in FIG. 11 is followed to connect together second joint 217 and first joint 216 of structure mounting and supporting devices 200 of the third and forth rows, respectively. Then in the elongate, second supporting hardware fixing hole 212 the position at which the other supporting hardware 102 and elongate mounting hardware 103 are secured together is adjusted and structure mounting and supporting device 200 of the third row thus has the other supporting hardware 102 and elongate mounting hardware 103 secured together. For example, in FIG. 15, of four second supporting hardware fixing holes 212 defined in elongate mounting hardware 103 in the longitudinal direction, the second one as seen from the center of elongate mounting hardware 103 is used, and as second supporting hardware fixing hole 212 is formed to be vertically elongate, a center portion thereof is used to secure the other supporting hardware 102 and elongate mounting hardware 103 together. Furthermore, in FIG. 16, of four second supporting hardware fixing holes 212 defined in elongate mounting hardware 103 in the longitudinal direction, the third one as seen from the center of elongate mounting hardware 103 is used, and as second supporting hardware fixing hole 212 is formed to be vertically elongate, a portion thereof that is adjacent to the sheathing is used to secure the other supporting hardware 102 and elongate mounting hardware 103 together. Thus structure mounting and supporting devices 200 of the third and fourth rows can be joined together while panels 230 mounted and thus fixed on them, respectively, can both be mounted along a curved surface of a roof. Note that if mounted on a curved roof forming different arcs, it is preferable that trough 228 of a seam of the sheathing serve as a reference and structure mounting and supporting devices 200 be arranged closer to the eaves and the ridge, respectively, with reference to trough 228.

Third Embodiment

Figure 17:
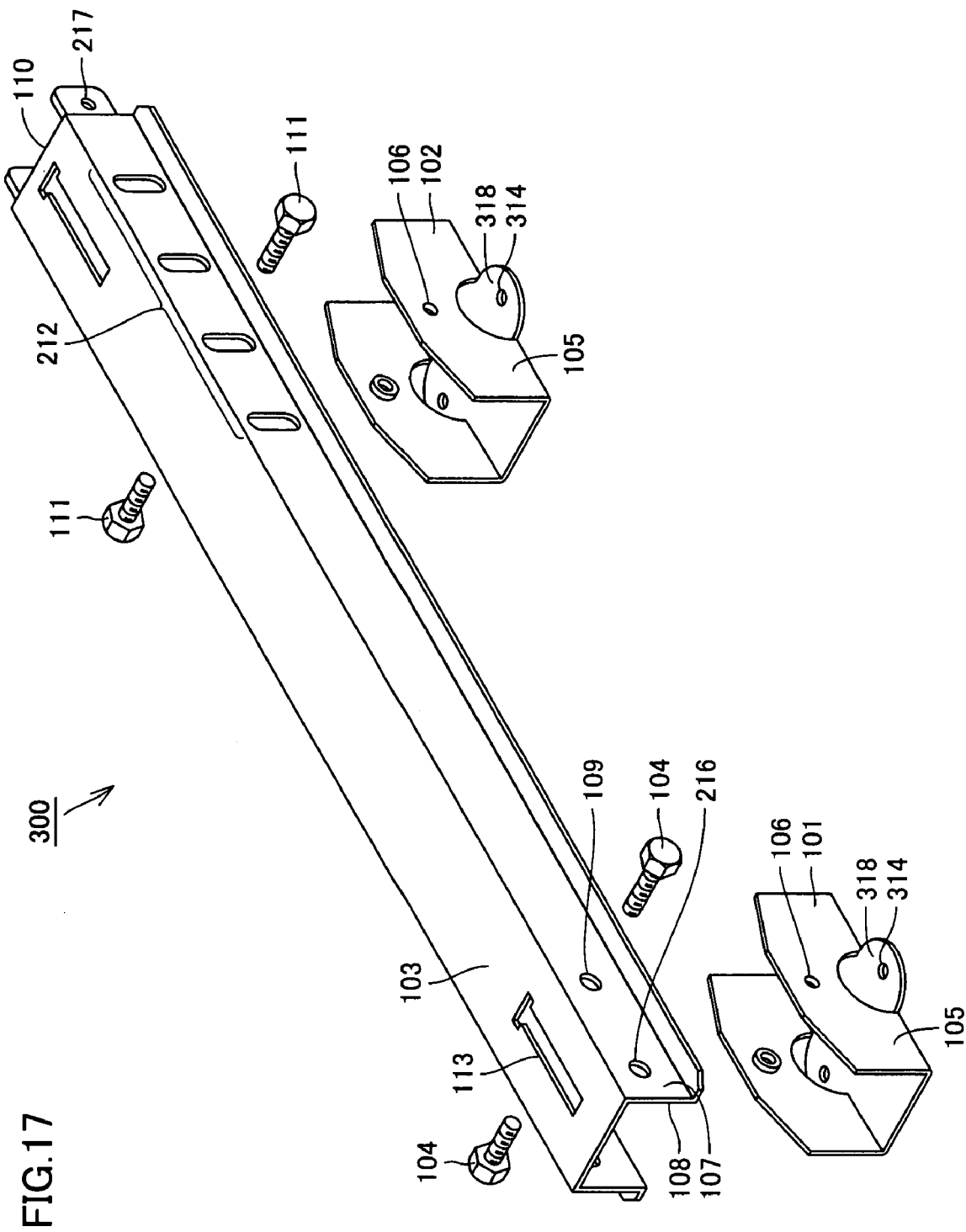
FIG. 17 is a perspective view of an external appearance of a structure mounting and supporting device of a third embodiment.

A third embodiment provides a structure mounting and supporting device basically similar in configuration to that of the second embodiment described above, except that the third embodiment differs from the second embodiment in that one supporting hardware 101 and the other supporting hardware 102 are configured as shown in FIG. 17.

More specifically, as shown in FIG. 17, a structure mounting and supporting device 300 includes one supporting hardware 101 and the other supporting hardware 102. One supporting hardware 101 has side portion 105 partially cut open to provide a fin 318 flush with a bottom side of one supporting hardware 101, i.e., a side thereof in contact with the sheathing. One supporting hardware 101 has fin 318 at opposite side portions 105. Furthermore fin 318 has a screw hole 314 for fixing one supporting hardware 101 to the sheathing. The other supporting hardware 102 similarly has two fins 318.

Figure 18A:
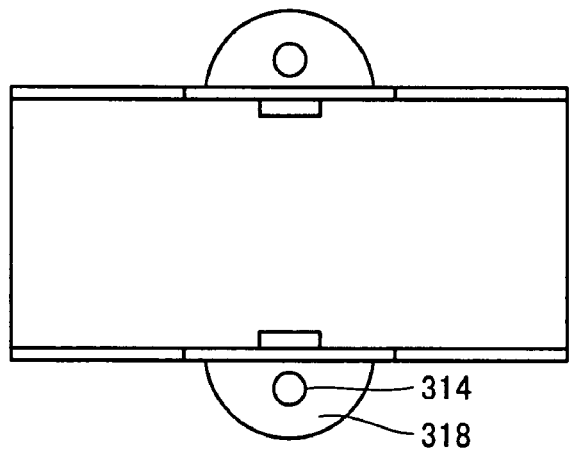
FIGS. 18A-18C are plan, front and side views, respectively, of a fixing member shown in FIG. 17.
Figure 18C:
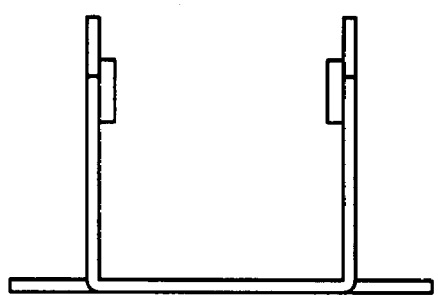
Figure 18B:
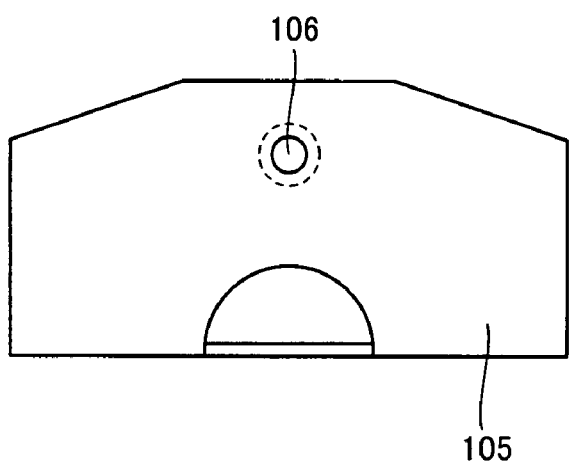

FIG. 18B shows one supporting hardware 101 and the other supporting hardware 102 in a front view, which shows the supporting hardware's side portion 105 partially cut open, and FIG. 18A is a plan view of the supporting hardware with side portion 105 having the cut and opened portion forming fin 318 flush with the bottom side and having screw hole 314 for fixing the fixing member to the sheathing.

Structure mounting and supporting device 300 including supporting hardware having screw hole 314 outer than side portion 105 for fixing one supporting hardware 101 and the other supporting hardware 102 to the sheathing, as shown in FIG. 17, allows a method of mounting and supporting a structure, that allows a fixing member to be previously attached to a supporting member.

Reference will be made FIG. 19 to describe one example of the method of mounting and supporting a structure with structure mounting and supporting device 300 employed. When this method is employed, the manner described at step S100 indicated in FIG. 8 is employed to provide marking in the direction of a tilt of a roof and the direction of the ridge of the roof. Thereafter, as shown in FIG. 19, a process for fixing the fixing member and the supporting member is performed.

Figure 19:
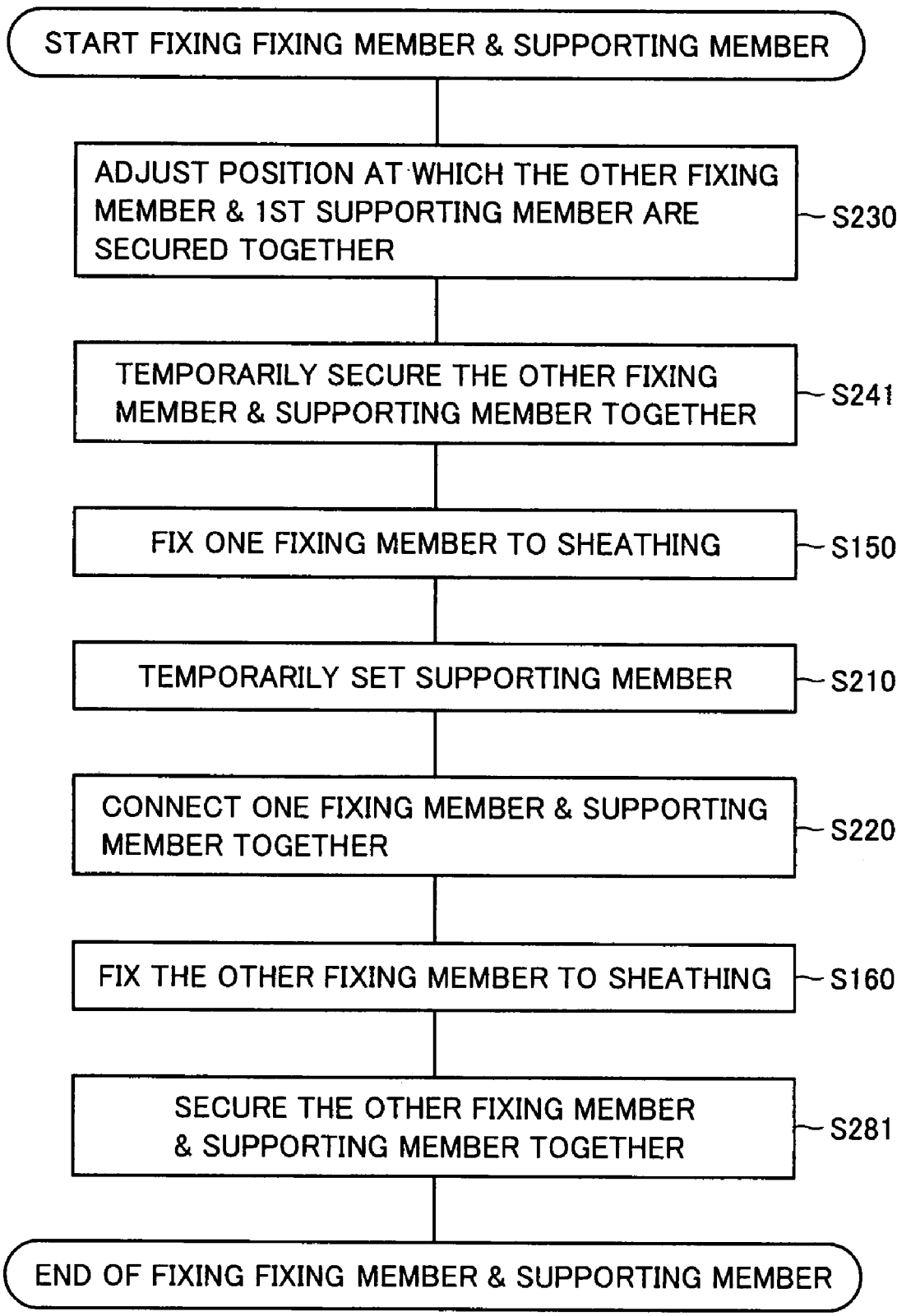
FIG. 19 is a flowchart specifically showing an another exemplary variation of the step of fixing a fixing member and a supporting member.

With reference to FIG. 19 initially at step S230 a position at which the other fixing member and the supporting member are secured together is adjusted. More specifically, a position at which the round drawn tap 106 of side portion 105 of the other supporting hardware 102 is connected is adjusted relative to the elongate, second supporting hardware fixing hole 112 of the other end 110 of side portion 107 of elongate mounting hardware 103.

Step S241 is then performed to temporarily fix the other fixing member and the supporting member together. More specifically, bolt 111 is inserted into second supporting hardware fixing hole 212 of elongate mounting hardware 103 and drawn tap 106 of the other supporting hardware 102 and temporarily, loosely tightened within the range of the elongate, second supporting hardware fixing hole 212.

Step 150 is then performed to fix one fixing member to the sheathing. More specifically, one supporting hardware 101 is placed at an intersection of the marking lines extending in the direction of the tilt of the roof and the direction of the ridge, and screwed to the sheathing perpendicularly.

Then at step S210 the supporting member is temporarily placed. More specifically, elongate mounting hardware 103 is temporarily set on a surface of the roof such that it is bourn by one supporting hardware 101 fixed to the sheathing and the other supporting hardware 102 temporarily fixed to elongate mounting hardware 103. In doing so, elongate mounting hardware 103 is set to have one end 108 closer to the eaves.

Then at step S220 one fixing member and the supporting member are connected together. More specifically, drawn tap 106 of side portion 105 of one supporting hardware 101 and first supporting hardware fixing hole 109 of one end 108 of side portion 107 of elongate mounting hardware 103 are connected together. In this state, one supporting hardware 101 and elongate mounting hardware 103 are connected pivotably relative to each other such that a direction perpendicular to the elongate mounting hardware's side portion 107 serves as an axis of pivotation.

Then at step S160 the other fixing member is fixed to the sheathing. More specifically, the other supporting hardware 102 is screwed to the sheathing perpendicularly. Screw hole 314 outer than side portion 105 facilitates fixing to the sheathing the other supporting hardware 102 temporarily secured to elongate mounting hardware 103 at step S241.

Then at step S281 the other fixing member and the supporting member are secured together. More specifically, the other supporting hardware 102 and elongate mounting hardware 103 are secured together with bolt 111 inserted through second supporting hardware fixing hole 212 and drawn tap 106 of elongate mounting hardware 103 and the other supporting hardware 102, respectively, temporarily secured together at step S241.

Thus structure mounting and supporting device 300 allows a method of mounting and supporting a structure that allows the other fixing member to be previously attached to the supporting member. This allows marking on a roof less frequently. In other words, it can eliminate the necessity of determining the position of the other supporting hardware 102 by marking. This can contribute to an alleviated operation of installation on the roof. A method of mounting and supporting a structure more efficiently can thus be provided.

While in the first to third embodiments the sheathing has a dimension of 910 mm in the direction of a tilt of a roof and 1,820 mm in the direction of the ridge of the roof as a standard, the present structure mounting and supporting device is applicable to sheathing of different dimensions by adjusting the supporting member in longitudinal dimension. Furthermore, the structure mounting and supporting device is not limited to being arranged with its longitudinal direction along the direction of the tilt of the roof. It is also applicable to a roof having a plurality of pieces of sheathing inclined at different angles as seen in the direction of the ridge of the roof. Furthermore, while an example of mounting a structure on a top surface of a roof having a plurality of pieces of sheathing inclined at different angles has been described, the structure mounting and supporting device is also applicable to mounting the structure on a top surface of a flat roof.

Fourth Embodiment

Figure 20:
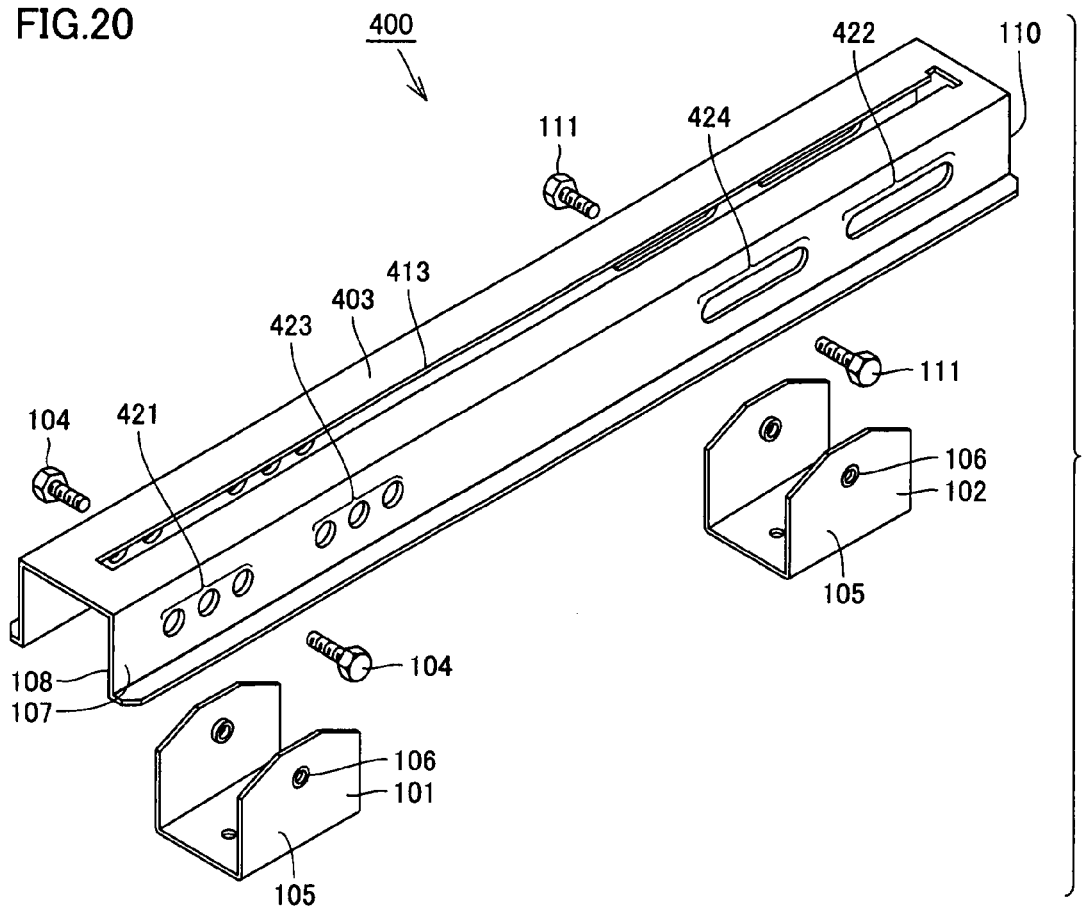
FIG. 20 is a perspective view of a structure of a structure mounting and supporting device of a fourth embodiment.

As shown in FIG. 20, a structure mounting and supporting device 400 includes a plurality of supporting members represented by one supporting hardware 101 and the other supporting hardware 102 and a supporting member represented by elongate mounting hardware 403.

One supporting hardware 101 and the other supporting hardware 102 have side portion 105 having a fixing portion for fixing elongate mounting hardware 403. The fixing portion has a portion having a round fixing hole represented by a drawn tap 106. In other words, at drawn tap 106, the supporting hardware's side portion 105 has a drawn hole. The drawn hole has an internal side worked to be helically threaded to allow attachment with a screw rod.

Elongate mounting hardware 403 includes a plurality of first attachment portions 421 and 423. More specifically, elongate mounting hardware 403 has first attachment portions 421 and 423 situated at one end 108, as seen in its longitudinal direction, at opposite side portions 107 and having a portion with a round attachment hole. Elongate mounting hardware 403 also includes a plurality of second attachment portions 422 and 424 equal in number to the first attachment portions. More specifically, elongate mounting hardware 403 has the second attachment portions 422 and 424 situated at the other end 110, as seen in the longitudinal direction, at opposite side portions 107 and having a portion having an elongate hole with opposite ends. The second attachment portion 422, 424 has the elongate hole extending in the longitudinal direction of elongate mounting hardware 403. Alternatively, second attachment portion 422, 424 may have the elongate hole inclined relative to the longitudinal direction of elongate mounting hardware 403.

Furthermore, elongate mounting hardware 403 has a top surface having a slot 413 for attaching a lateral frame thereto so as to traverse the longitudinal direction of elongate mounting hardware 403. Slot 413 is defined in the top surface of elongate mounting hardware 403 along the length of elongate mounting hardware 403. For example, if elongate mounting hardware 403 has a longitudinal dimension of 520 mm, slot 413 can be defined to have a length of 490 mm in the longitudinal direction of elongate mounting hardware 403. This allows the lateral frame to be attached to elongate mounting hardware 403 at any position in the longitudinal direction of elongate mounting hardware 403.

The supporting member or elongate mounting hardware 403 is connected at first attachment portion 421, 423 by means of an attachment hole to one of a plurality of fixing members, or one supporting hardware 101, at the fixing portion by means of the round fixing hole or drawn tap 106. Elongate mounting hardware 403 is connected to one supporting hardware 101 relatively pivotably such that a direction perpendicular to the elongate mounting hardware's side portion 107 is that of the axis of pivotation. Furthermore the supporting member or elongate mounting hardware 403 is connected at second attachment portion 422, 424 by means of an elongate hole to the other of the plurality of fixing members, or the other supporting hardware 102, at the fixing portion by means of the round fixing hole or drawn tap 106 with bolt 111 or a similar securing member.

More specifically, one supporting hardware 101 and elongate mounting hardware 403 are arranged such that side portion 105 and side portion 107 have an outer surface and an inner surface, respectively, facing each other preferably in contact with each other, and bolt 104 is inserted through an attachment hole and screwed into drawn tap 106 of one supporting hardware 101. Elongate mounting hardware 403 is thus supported axially by bolt 104 inserted through the attachment hole and drawn tap 106. The direction in which bolt 104 serving as the axis of pivotation is inserted is only required to be substantially perpendicular to a plane including side portion 107 of the elongate mounting hardware. This is done at the opposite side portions of elongate mounting hardware 403 so that elongate mounting hardware 403 is supported pivotably around bolt 104 relative to one supporting hardware 101.

Furthermore, one supporting hardware 101 and elongate mounting hardware 403 may be formed to abut against each other. For example, it is preferable that one supporting hardware 101 have side portion 105 having an upper portion partially cut off for example in the form of a straight line, an arc or the like to provide a top end portion, and that the top end portion and an internal back surface of elongate mounting hardware 403, i.e., an inner side of the top surface of elongate mounting hardware 403, i.e., that side of the surface having slot 413 which faces a surface of a roof when mounted on the roof, partially abut against each other to avoid preventing one supporting hardware 101 and elongate mounting hardware 403 from pivoting relative to each other. This partial abutment allows one supporting hardware 101 to support elongate mounting hardware 403 at both bolt 104 and the abutting portion to achieve firmer attachment.

Furthermore, as one supporting hardware 101 and elongate mounting hardware 403 are only required to be connected pivotably relative to each other, bolt 104 may be replaced by: inserting a pin for axial support; fitting a protrusion defined at side portion 107 of the elongate mounting hardware into a recess defined at side portion 105 of the supporting hardware; or the like.

Furthermore, the other supporting hardware 102 and elongate mounting hardware 403 are arranged such that side portion 105 and side portion 107 have an outer surface and an inner surface, respectively, facing each other preferably in contact with each other, and bolt 111 is inserted through an elongate hole extending in the longitudinal direction of elongate attachment hardware 403, and screwed into drawn tap 106 of the other supporting hardware 102. Bolt 111 can be inserted through the elongate hole at a desired position adjusted within the range of the elongate hole. In other words, the second attachment portion's elongate hole can provide a plurality of positions allowing bolt 111 or a similar securing member to secure elongate mounting hardware 403 to the other supporting hardware 102 so that a position allowing the other supporting hardware 102 and elongate mounting hardware 403 to be best arranged and secured together can be selected as desired from the plurality of positions to secure and thus fix the other supporting hardware 102 and elongate mounting hardware 403 together. This is done at the opposite sides of elongate mounting hardware 403 to fix elongate mounting hardware 403 to the other supporting hardware 102 within the range of the elongate hole. Preferably the other supporting hardware 102 and elongate mounting hardware 403 closely contact each other. Furthermore, preferably, the other supporting hardware 102 and elongate mounting hardware 403 are sandwiched by a detachably attachable member, such as bolt 111 and drawn tap 106 as shown in FIG. 20, and thus connected and fixed together.

Figure 21:
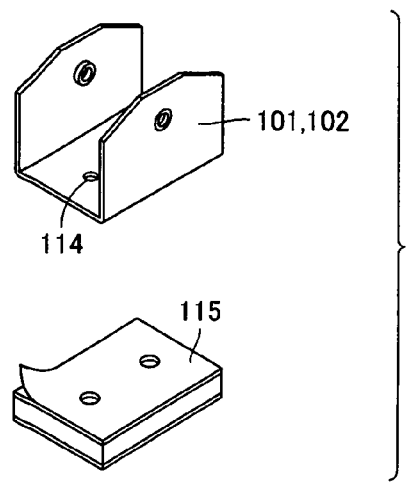
FIG. 21 schematically shows a water-shutoff member bonded to the fixing member.

As shown in FIG. 21, one supporting hardware 101 and the other supporting hardware 102 have a bottom surface, i.e., a surface that contacts a base material when they are attached to a roof, with two screw holes 114, for example, for fixing one supporting hardware 101 and the other supporting hardware 102 to the base material. The fixing member has a bottom side, i.e., a side adjacent to the base material, with an external surface, i.e., a surface adjacent to the base material, having water-shutoff member 115 bonded thereon to shut off water from a portion tapped to fix one supporting hardware 101 and the other supporting hardware 102 to the base material. Water-shutoff member 115 can be in the form of a plate, as shown in FIG. 21, and in that case, preferably, it is formed to be slightly smaller than the bottom side. Water-shutoff member 115 may be formed of any material that can be pressed by screwing the fixing member to the base material to shut off water from the portion tapped to fix one supporting hardware 101 and the other supporting hardware 102 to the base material. For example it can be formed of butyl rubber, foamed ethylene-propylene terpolymer (EPDM) rubber, and the like.

Figure 22:
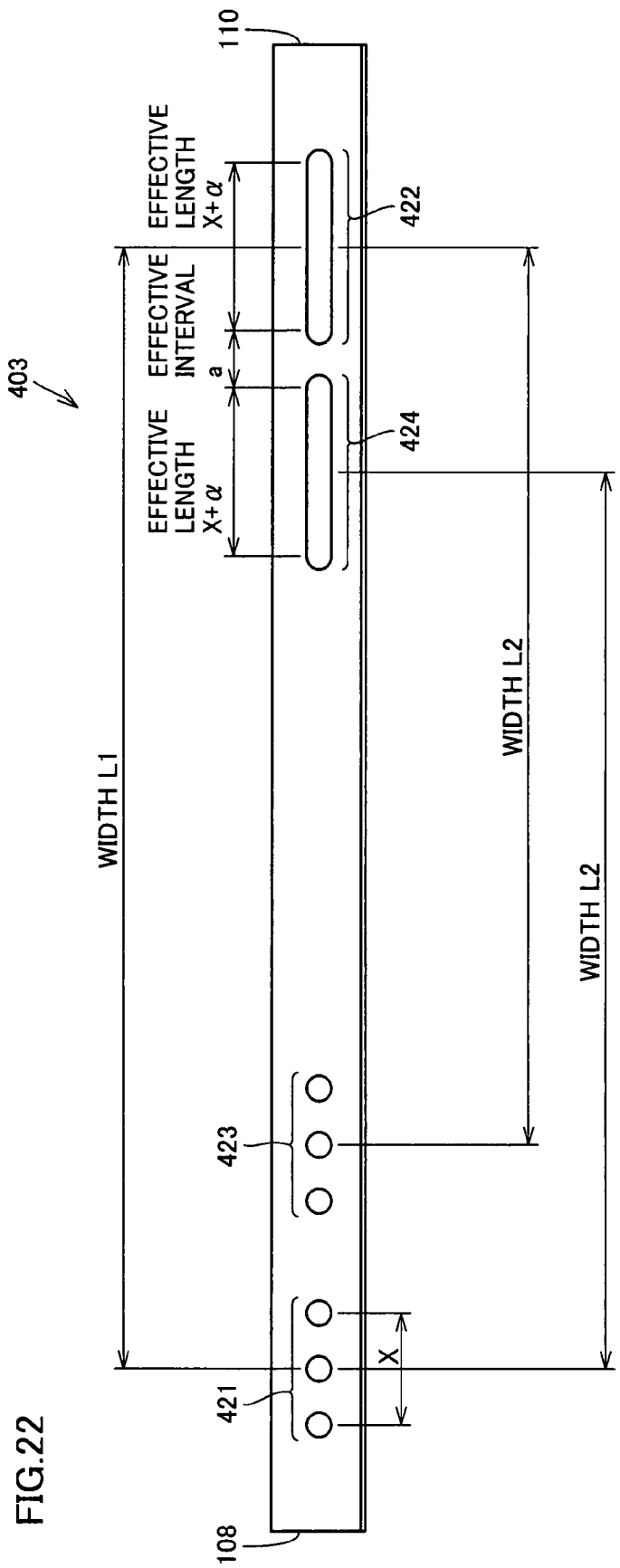
FIG. 22 is a side view of elongate mounting hardware.
Figure 23:
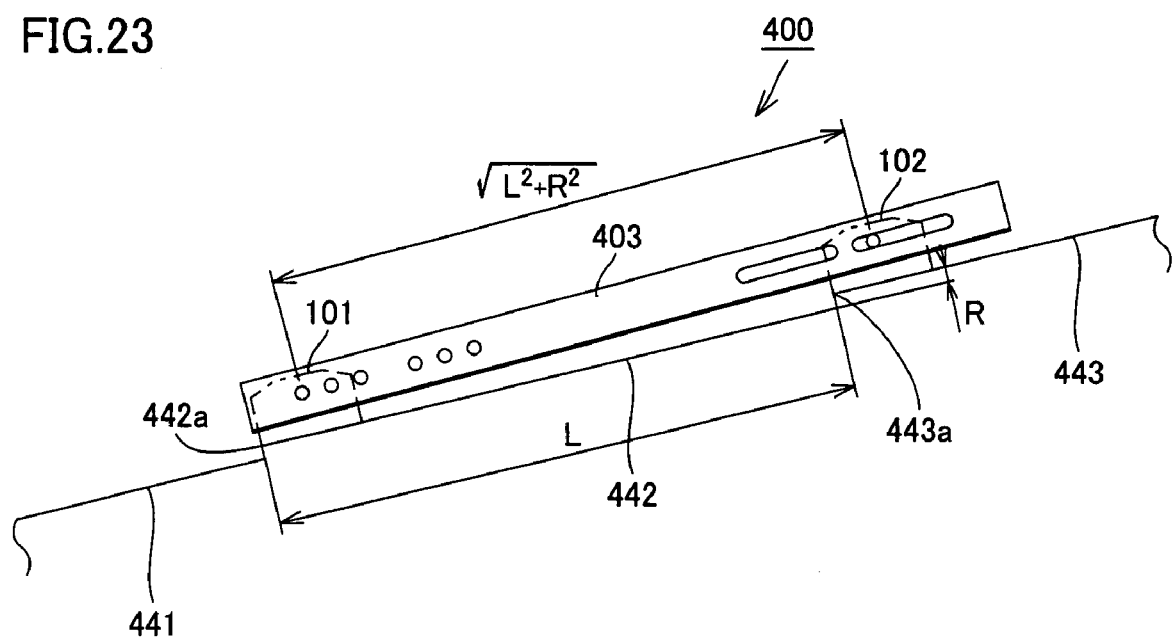
FIG. 23 schematically shows the structure mounting and supporting device fixed to a stepwise base material.

With reference to FIGS. 22 and 23, the elongate mounting hardware has the attachment hole and the elongate hole in a relationship, as will be described hereinafter. As shown in FIG. 22, the first attachment portions 421, 423 each have three attachment holes formed in the longitudinal direction of the supporting member or elongate mounting hardware 403. The first attachment portion 421, 423 and the second attachment portion 422, 424 have the attachment holes and the elongate hole, respectively, on the same straight line extending in the longitudinal direction of the supporting member or elongate mounting hardware 403. More specifically, the attachment holes and the elongate hole are defined to have a center and a longer diameter, respectively, on the same straight line. Of the three attachment holes of the first attachment portion 421, 423, the two holes that are the most distant from each other, i.e., the hole closest to one end 108 and that closest to the other end 110 have their respective centers spaced by a distance indicated by a line segment x. The first attachment portion and the second attachment portion may have the attachment holes and the elongate hole, respectively, on parallel lines extending in the longitudinal direction of the supporting member.

As shown in FIG. 23, structure mounting and supporting device 400 is fixed to a roof having pieces 441-443 of a base material arranged stepwise in the direction of the tilt of the roof. FIG. 23 also shows an exposure length L and a dimension in height R. As shown in FIG. 23, first fixing hardware 101 is fixed to piece 442 in contact with an end 442a of piece 442 closer to the eaves and second fixing hardware 102 is fixed to piece 443 in contact with an end 443a of piece 443 closer to the eaves. Elongate mounting hardware 403 is carried by first fixing hardware 101 and second fixing hardware 102. Exposure length L and dimension in height R indicate orthogonal dimensions. Accordingly, the distance between end 442a of piece 442 closer to the eaves and end 443a of piece 443 closer to the eaves is:

$$\sqrt{(L^2+R^2)}.$$

Accordingly, the distance between the fixing holes of first and second fixing hardware 101 and 102, respectively, is:

$$\sqrt{(L^2+R^2)}.$$

In other words, the distance between the center of the attachment hole of the first attachment portion that is connected to the fixing hole of the first fixing hardware 101 and the center of the fixing hole of second fixing hardware 102 at the position at which the fixing hole of second fixing hardware 102 is connected to the elongate hole of the second attachment portion is:

$$\sqrt{(L^2+R^2)}.$$

Herein, defining $$\alpha=2\{\sqrt{(L^2+R^2)}-L\}$$

and determining the effective length of the elongate hole of the second attachment portion 422, 424 by x+α, ensures that the supporting member or elongate mounting hardware 403 is mounted on stepwise pieces 442, 443. Determining the elongate hole's effective length in accordance with dimension in height R ensures that elongate mounting hardware 403 is mounted even on stepwise pieces 442, 443. Note that the elongate hole's effective length may be determined to fall within a range of 100% to 105% of x+α.

Furthermore if elongate holes are arranged with an effective interval a therebetween, effective interval a set to be smaller than the line segment of those bounded by the centers of any two adjacent attachment holes that has the smallest length, ensures that the fixing member and the supporting member are fixed together. For example, if that attachment hole of those of the first attachment portion which is closest to one end 108 is used to connect elongate mounting hardware 403 and first fixing hardware 101 together, then, depending on some relationship between exposure length L of the base material and the longitudinal dimension of elongate mounting hardware 403, second fixing hardware 102 can have the fixing hole positioned at a position between the two elongate holes of second attachment portions 422 and 424, i.e., a portion that does not have an elongate hole. In such a case, the attachment hole connected to the fixing hole of first fixing hardware 101 can be offset by one and elongate mounting hardware 403 can be connected to first fixing hardware 101 at the second attachment hole as counted from one end 108. Second fixing hardware 102 can thus have the fixing hole at a position overlapping the elongate hole of second attachment portion 422, and second fixing hardware 102 and second attachment portion 422 can have the fixing hole and the elongate hole, respectively, connected together. Elongate mounting hardware 403 can thus be fixed to first fixing hardware 101 and second fixing hardware 102.

For example, as shown in FIG. 22, if the first attachment portion 421 has the three holes equally spaced, effective interval a can be determined to satisfy a<x/2.

Furthermore, it is assumed that first and second attachment portions of elongate mounting hardware 403 that are provided to be equal in number are successively paired as seen from one end 108. For example, as shown in FIG. 22, first and second attachment portions 421 and 424 will be paired, and so will first and second attachment portions 423 and 422. Herein the distance between the midpoint of line segment x bounded by those two of the attachment holes of first attachment portion 421 which are the most distant from each other and the midpoint of the longer diameter of the elongate hole of second attachment portion 424 paired with first attachment portion 421, i.e., the midpoint of the line segment bounded by the two points in the elongate hole that are the most distant from each other in the longitudinal direction of the supporting member (or elongate mounting hardware 403), will be represented by a width L2. Furthermore, the distance between the midpoint of line segment x bounded by those two of the attachment holes of first attachment portion 421 which are the most distant from each other and the midpoint of the longer diameter of the elongate hole of second attachment portion 422, i.e., the midpoint of the line segment bounded by the two points in the elongate hole that are the most distant from each other in the longitudinal direction of the supporting member (or elongate mounting hardware 403), will be represented by a width L1.

In other words, width L1 is a distance between a center point of a plurality of attachment holes of one of first attachment portions that is the closest to one end 108 in the longitudinal direction of elongate mounting hardware 403 and a center point of the elongate hole of one of second attachment portions that is the closest to the other end 110 and width L2 is a distance between a center point of the plurality of attachment holes of a first attachment portion and that of the elongate hole of the second attachment portion paired with the first attachment portion, and the base material's exposure length L can be limited to a range of L2 to L1. In other words, the supporting member can have the attachment holes and elongate holes defined to set width L1 to be equal or larger than the base material's exposure length L and width L2 to be equal or smaller than the base material's exposure length L. The supporting member formed in accordance with the base material's exposure length can prevent a structure fixed to and thus supported by the supporting member from excessively protruding outer than the supporting member and thus providing a less aesthetical appearance.

Figures 24A, 24B, 24C:
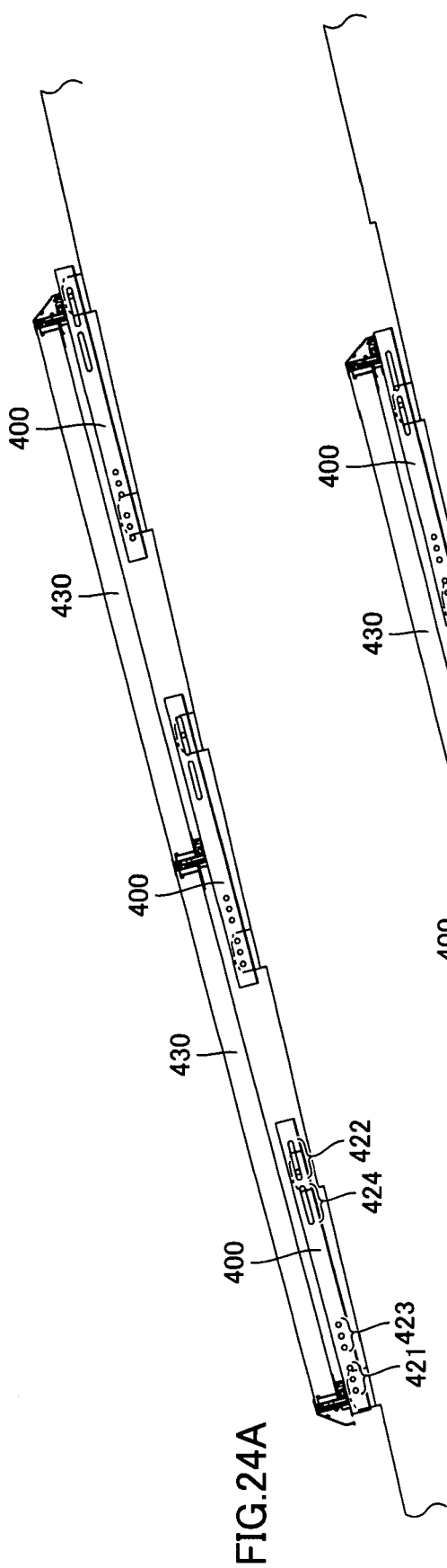
FIG. 24A shows an embodiment of providing a plurality of structure mounting and supporting devices of FIG. 20 on a top surface of a roof, with the base material having an exposure length L equal to a width L1.
FIG. 24B shows an embodiment of providing a plurality of structure mounting and supporting devices of FIG. 20 on a top surface of a roof, with the base material having exposure length L intermediate between widths L1 and L2.
FIG. 24C shows an embodiment of providing a plurality of structure mounting and supporting devices of FIG. 20 on a top surface of a roof, with the base material having exposure length L equal to width L2.

Hereinafter will be described an example of employing structure mounting and supporting device 400 to mount a structure on a top surface of a roof having a plurality of pieces of a base material that are arranged stepwise. FIGS. 24A-24C show one example with a supporting member having a longitudinal dimension of 530 mm, width L1 of 400 mm, width L2 of 320 mm, and x=40 mm. Furthermore, in FIG. 24A, each piece of the base material has exposure length L of 400 mm and dimension in height R of 8 mm. In FIG. 24B, it has exposure length L of 360 mm and dimension in height R of 8 mm. In FIG. 24C, it has exposure length L of 320 mm and dimension in height R of 8 mm. Furthermore, the example is also an example of arranging two structures 430, each having a dimension of 990 mm in the direction of the tilt of the roof, in that direction.

In FIG. 24A the base material has exposure length L equal to width L1, i.e., 400 mm. Accordingly, first attachment portions 421 and second attachment portion 422 can be used to attach structure 430 on the top surface of the roof while preventing structure 430 from significantly protruding outer than structure mounting and supporting device 400. For structure mounting and supporting device 400 closest to the eaves as seen in the direction of the tilt of the roof, which will hereinafter be referred to as structure mounting and supporting device 400 of the first row, the attachment hole of first attachment portion 421 that is closest to the eaves and the fixing hole of one fixing hardware 101 are connected together, and the fixing hole of the other fixing hardware 102 and the elongate hole of second attachment portion 422 are connected together. Structure mounting and supporting device 400 adjacent to that of the first row and closer to the ridge in the direction of the tilt of the roof than that of the first row is, which will hereinafter be referred to as structure mounting and supporting device 400 of the second row, is only required to be disposed at a position at which structures 430 meet. Slot 413 that elongate attachment hardware 403 has in its top surface along its length allows a lateral frame to be attached at any position in the longitudinal direction of structure mounting and supporting device 400, and structure mounting and supporting device 400 of the second row disposed at the position at which structures 430 meet allows structure 430 to be mounted and supported. For structure mounting and supporting device 400 adjacent to that of the second row and closer to the ridge in the direction of the tilt of the roof than that of the second row is, which will hereinafter be referred to as structure mounting and supporting device 400 of the third row, the attachment hole of first attachment portion 421 that is closest to the ridge and the fixing hole of one fixing hardware 101 are connected together, and the fixing hole of the other fixing hardware 102 and the elongate hole of second attachment portion 422 are connected together. Consequently structure 430 disposed closest to the ridge of the roof has a portion closer to the ridge, supported by a lateral frame set in a vicinity of the other end 110 of structure mounting and supporting device 400 of the third row. Structure 430 can thus be mounted without structure mounting and supporting device 400 of the third row significantly protruding outer than structure 430 in the direction of the tilt of the roof.

In the FIG. 24B, the base material has exposure length L of 360 mm, which is a dimension intermediate between widths L1 and L2. In this case, for structure mounting and supporting device 400 of the first row, the attachment hole of first attachment portion 423 that is closest to the eaves and the fixing hole of one fixing hardware 101 are connected together, and the fixing hole of the other fixing hardware 102 and the elongate hole of second attachment portion 422 are connected together. Structure mounting and supporting device 400 of the second row is only required to be disposed at a position at which structures 430 meet, as has been described with reference to FIG. 24A. For structure mounting and supporting device 400 of the third row, the attachment hole of first attachment portion 421 that is closest to the eaves and the fixing hole of one fixing hardware 101 are connected together, and the fixing hole of the other fixing hardware 102 and the elongate hole of second attachment portion 424 are connected together. Consequently structure 430 can be mounted without structure mounting and supporting device 400 significantly protruding outer than structure 430.

In FIG. 24C the base material has exposure length L equal to width L2, i.e., 320 mm. Accordingly, a combination of first attachment portion 421 and second attachment portion 424 or that of first attachment portion 423 and second attachment portion 422 can be used to fix structure mounting and supporting device 400 for installation without structure mounting and supporting device 400 significantly protruding outer than structure 430. For structure mounting and supporting device 400 of the first row, the attachment hole of first attachment portion 421 that is closest to the eaves and one fixing hardware 101 are connected together, and the fixing hole of the other fixing hardware 102 and the elongate hole of second attachment portion 424 are connected together. Structure mounting and supporting device 400 of the second row is only required to be disposed at a position at which structures 430 meet, as has been described with reference to FIGS. 24A and 24B. For structure mounting and supporting device 400 of the third row, the attachment hole of first attachment portion 423 that is closest to the eaves and the fixing hole of one fixing hardware 101 are connected together, and the fixing hole of the other fixing hardware 102 and the elongate hole of second attachment portion 422 are connected together. Consequently structure 430 can be mounted without structure mounting and supporting device 400 significantly protruding outer than structure 430.

Thus structure mounting and supporting device 400 allows adjusting a position at which a supporting member is set and fixed to a fixing member, which is fixed to a stepwise base material in the direction of the tilt of a roof, in accordance with the base material's exposure length. This allows a position of an attachment hole and a position of an elongate hole to be selected that allow the supporting member to be parallel to the base material. The supporting member can thus also be set parallel to the stepwise base material and a structure can thus be mounted along a surface of a roof. Furthermore, identically structured structure mounting and supporting devices 400 can be used to mount a structure on a top surface of a roof having a base material varying in exposure length. Furthermore, for a plurality of pieces of a base material that are equal in exposure length, a plurality of supporting members can be fixed thereto linearly. This allows a structure to be arranged in a flat plane, and fixed at opposite sides, i.e., a side closer to the eaves and that closer to the ridges, of a lateral frame attached to the supporting member and supporting the structure, as shown in FIGS. 24A-24C. Utilizing the opposite sides of the lateral frame to fix the structure can reduce a cost for installing the structure and also allows the structure to appear to be more integrated with a roof and hence more aesthetically, and also to be more resistant to wind.

Fifth Embodiment

Figure 25A:
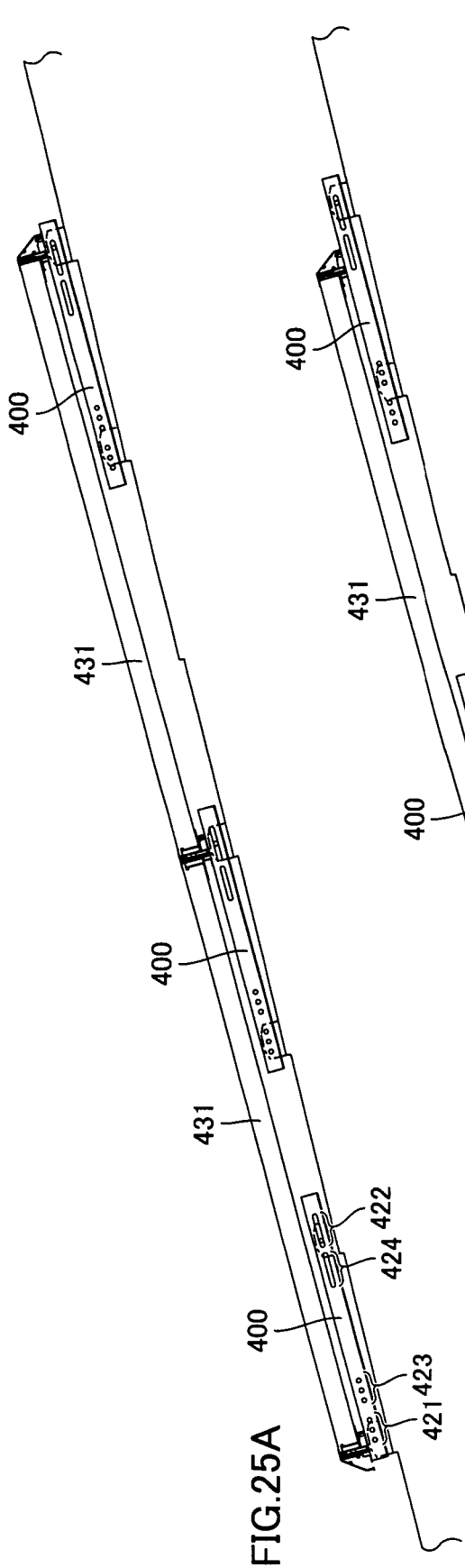
FIG. 25A shows another embodiment of providing a plurality of structure mounting and supporting devices of FIG. 20 on a top surface of a roof, with the base material having exposure length L equal to width L1.
Figure 25B:
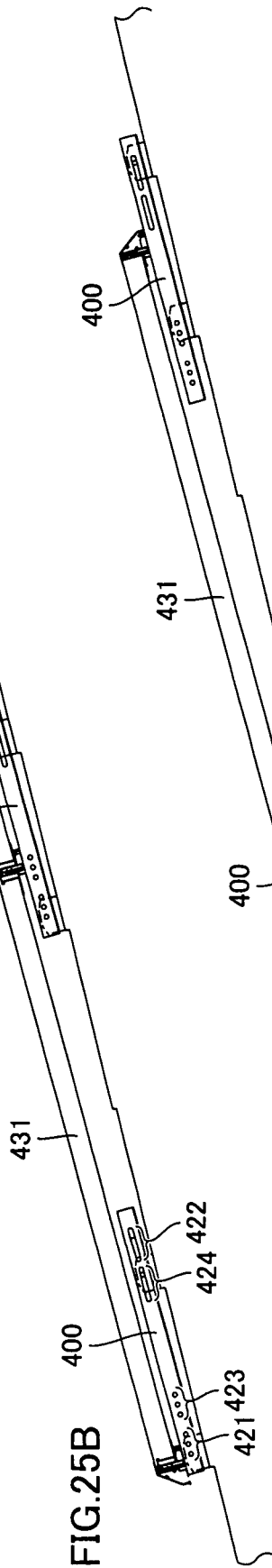
FIG. 25B shows another embodiment of providing a plurality of structure mounting and supporting devices of FIG. 20 on a top surface of a roof, with the base material having exposure length L intermediate between widths L1 and L2.
Figure 25C:
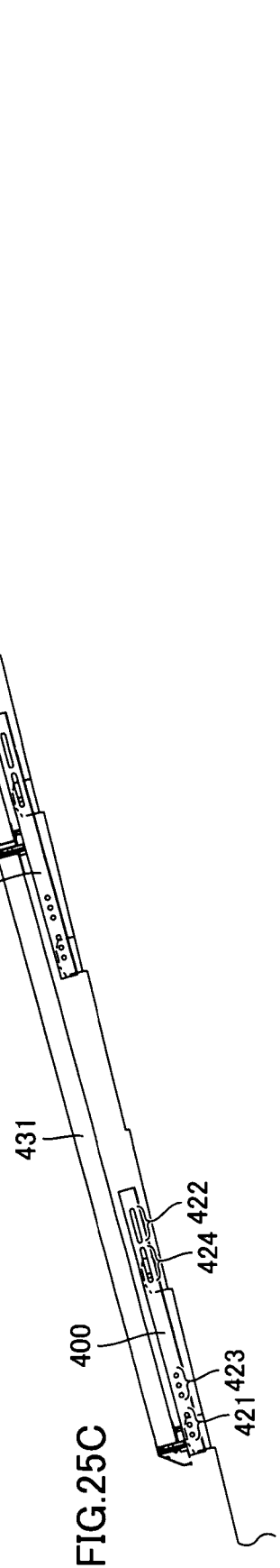
FIG. 25C shows another embodiment of providing a plurality of structure mounting and supporting devices of FIG. 20 on a top surface of a roof, with the base material having exposure length L equal to width L2.

FIGS. 25A-25C shows a fifth embodiment, which is identical to the fourth embodiment in the dimension and geometry of structure mounting and supporting device 400 and the base material's exposure length. The fifth embodiment, however, differs from the fourth embodiment in that the former shows an example of arranging two structures 431, each having a dimension of 1,200 mm in the direction of a tilt of a roof, in that direction.

In FIG. 25A, each piece of the base material has exposure length L equal to width L1, i.e., 400 mm. Accordingly, first attachment portion 421 and second attachment portion 422 can be used to mount structure 431 without structure mounting and supporting device 400 significantly protruding outer than structure 431. For structure mounting and supporting device 400 of the first row, the attachment hole of first attachment portion 421 that is closest to the eaves and the fixing hole of one fixing hardware 101 are connected together, and the fixing hole of the other fixing hardware 102 and the elongate hole of second attachment portion 422 are connected together. Structure mounting and supporting device 400 of the second row is only required to be disposed at a position at which structures 431 meet. For structure mounting and supporting device 400 of the third row, the attachment hole of first attachment portion 421 that is closest to the ridge and the fixing hole of one fixing hardware 101 are connected together, and the fixing hole of the other fixing hardware 102 and the elongate hole of second attachment portion 422 are connected together. Consequently structure 431 can be mounted without structure mounting and supporting device 400 significantly protruding outer than structure 431.

In the FIG. 25B, the base material has exposure length L of 360 mm, which is a dimension intermediate between widths L1 and L2. In this case, for structure mounting and supporting device 400 of the first row, the attachment hole of first attachment portion 421 that is closest to the eaves and the fixing hole of one fixing hardware 101 are connected together, and the fixing hole of the other fixing hardware 102 and the elongate hole of second attachment portion 424 are connected together. Structure mounting and supporting device 400 of the second row is only required to be disposed at a position at which structures 431 meet, as has been described with reference to FIG. 25A. For structure mounting and supporting device 400 of the third row, the attachment hole of first attachment portion 423 that is closest to the eaves and the fixing hole of one fixing hardware 101 are connected together, and the fixing hole of the other fixing hardware 102 and the elongate hole of second attachment portion 422 are connected together. Consequently structure 431 can be mounted without structure mounting and supporting device 400 significantly protruding outer than structure 431.

In FIG. 25C the base material has exposure length L equal to width L2, i.e., 320 mm. Accordingly, a combination of first attachment portion 421 and second attachment portion 424 or that of first attachment portion 423 and second attachment portion 422 can be used to fix structure mounting and supporting device 400 for installation without structure mounting and supporting device 400 significantly protruding outer than structure 431. For structure mounting and supporting device 400 of the first row, the attachment hole of first attachment portion 421 that is closest to the eaves and the fixing hole of one fixing hardware 101 are connected together, and the fixing hole of the other fixing hardware 102 and the elongate hole of second attachment portion 424 are connected together. Structure mounting and supporting device 400 of the second row is only required to be disposed at a position at which structures 431 meet, as has been described with reference to FIGS. 25A and 25B. For structure mounting and supporting device 400 of the third row, the attachment hole of first attachment portion 423 that is closest to the ridge and the fixing hole of one fixing hardware 101 are connected together, and the fixing hole of the other fixing hardware 102 and the elongate hole of second attachment portion 422 are connected together. Consequently structure 431 can be mounted without structure mounting and supporting device 400 significantly protruding outer than structure 431.

Thus, identical structure mounting and supporting devices 400 can be used to mount a structure on a top surface of a roof having a base material varying in exposure length L. Furthermore, if structures to be mounted are different in dimension in the direction of a tilt of a roof, identical structure mounting and supporting devices 400 can be used to mount the structures on a top surface of the roof. It is no longer necessary to employ different structure mounting and supporting devices allowing for the base material's exposure length and the structure's dimension as seen in the direction of the tilt of the roof. This allows components to be commonly used to fabricate structure mounting and supporting devices, and their effective mass production and a reduced cost attributed thereto for fabricating them.

Sixth Embodiment

Figure 26:
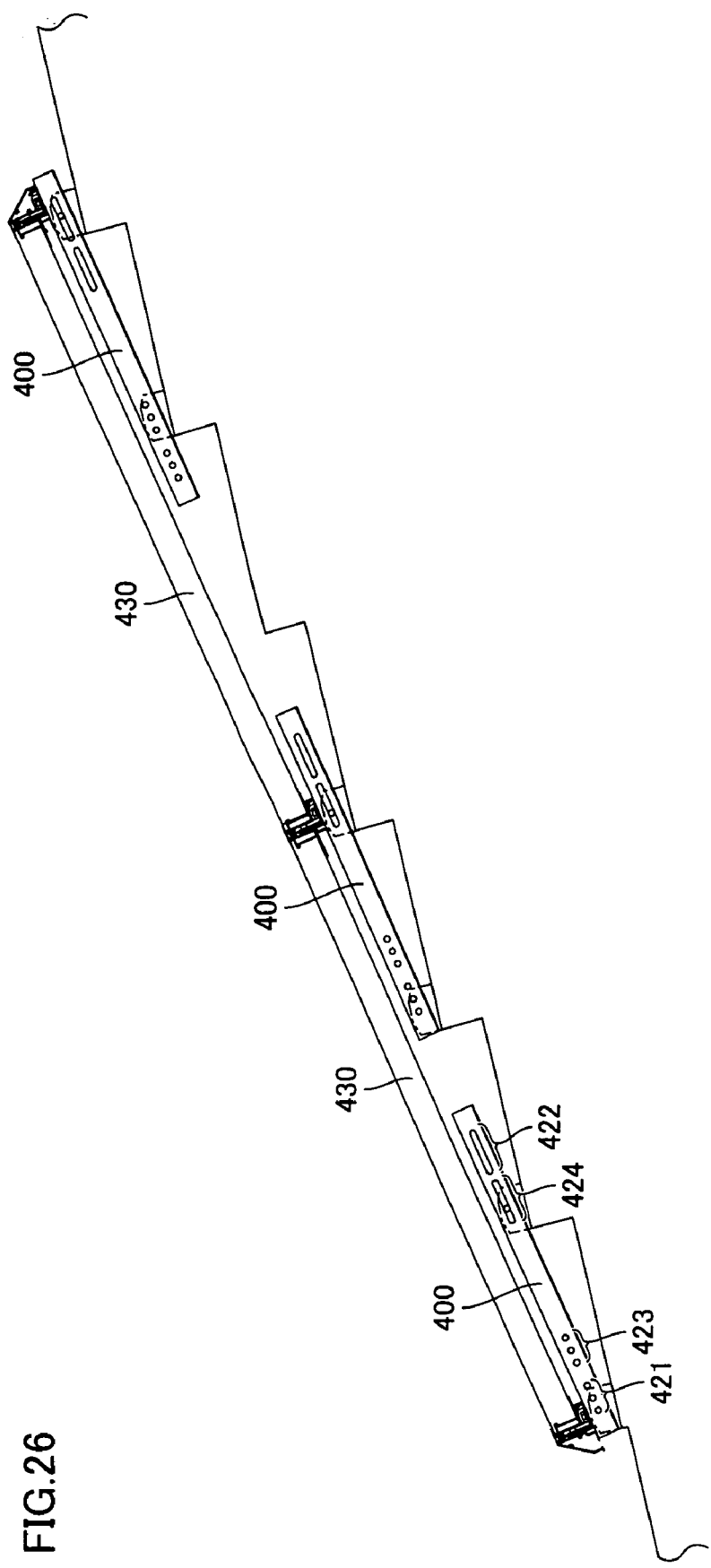
FIG. 26 shows still another embodiment of providing a plurality of structure mounting and supporting devices of FIG. 20 on a top surface of a roof.

FIG. 26 shows a sixth embodiment, which is identical to the fourth embodiment shown in FIG. 24C in the external dimension and geometry of structure mounting and supporting device 400 and the structure's dimension in the direction of a tilt of a roof. The sixth embodiment, however, differs from the fourth embodiment in that the base material has exposure length L of 320 mm and dimension in height R of 64 mm, and as dimension in height R increases, the effective length of an elongate hole determined by $$x+2\{\sqrt{(L^2+R^2)}-L\}$$

varies.

As shown in FIG. 26, each piece of the base material has exposure length L equal to width L2, i.e., 320 mm. Accordingly, a combination of first attachment portion 421 and second attachment portion 424 or that of first attachment portion 423 and second attachment portion 422 can be used to fix structure mounting and supporting device 400 for installation without structure mounting and supporting device 400 significantly protruding outer than structure 430. For structure mounting and supporting device 400 of the first row, the attachment hole of first attachment portion 421 that is closest to the eaves and the fixing hole of one fixing hardware 101 are connected together, and the fixing hole of the other fixing hardware 102 and the elongate hole of second attachment portion 424 are connected together. Structure mounting and supporting device 400 of the second row is only required to be disposed at a position at which structures 430 meet. For structure mounting and supporting device 400 of the third row, the center attachment hole of the three attachment holes of first attachment portion 423 and the fixing hole of one fixing hardware 101 are connected together, and the fixing hole of the other fixing hardware 102 and the elongate hole of second attachment portion 422 are connected together. Consequently structure 430 can be mounted without structure mounting and supporting device 400 significantly protruding outer than structure 430.

If a stepwise base material varies in dimension in height R, second attachment portion 422, 424 having an elongate hole having an effective length determined by $$x+2\{\sqrt{(L^2+R^2)}-L\}$$

ensures that structure 430 can be mounted on a top surface of a roof while structure 430 can have its appearance maintained, i.e., a plurality of structures 430 can be arranged in a flat plane.

Seventh Embodiment

FIG. 27 shows a seventh embodiment showing elongate mounting hardware 503 basically similar in structure to elongate mounting hardware 403 of the fourth embodiment, except that elongate mounting hardware 503 includes a plurality of first attachment portions 521, 522, 523 each having a single attachment hole, and a second attachment portion 524.

Furthermore a slot 513 for attaching a lateral frame is provided with tap hardware 525 slidably. Tap hardware 502 is adapted to be movable along slot 513 in the longitudinal direction of elongate mounting hardware 513. When a structure is to be fixed to and thus supported by elongate mounting hardware 503, a lateral frame of a base supporting the structure is fixed at a hole formed in tap hardware 525. As tap hardware 525 is movable in the longitudinal direction of elongate mounting hardware 503, the lateral frame can be fixed to elongate mounting hardware 503 at any position in the longitudinal direction of elongate mounting hardware 503 within a range in which slot 513 is defined.

The number of the first and second attachment portions of structure mounting and supporting device 400 is not limited to those described in the fourth to sixth embodiments. For example the elongate mounting hardware that has an increased longitudinal dimension can have increased numbers of first and second attachment portions, respectively. Any numbers of the first and second attachment portions, respectively, may be provided. Preferably, however, the first and second attachment portions are equal in number and paired, i.e., each first attachment portion's one or more attachment holes and a second attachment portion's elongate hole are paired and the number of attachment holes is a multiple of that of elongate hole.

While the structure mounting and supporting device described in the fourth to seventh embodiments is applied on a stepwise roof, it is also applicable to mounting a structure for example on a top surface of a flat roof, a domed roof, and the like.

While in the above description the supporting member and the fixing member are secured together with a bolt and so are the fixing member and the base material by way of example, they may be secured together for example with a rivet. Furthermore, the structure has been described as a solar cell module by way of example, it is not limited thereto and may for example be a solar energy collector, a display device, or a light emission device. Furthermore, the present structure mounting and supporting device is not limited to mounting a structure on a top surface of a roof, it is also applicable for example to suspending a structure from a ceiling, holding a structure on a wall surface, and the like.

Although the present technology has been described and illustrated in detail, it is clearly understood that the same is by way of illustration and example only and is not to be taken by way of limitation, the spirit and scope of the present technology being limited only by the terms of the appended claims.

What is claimed is:

1. A structure mounting and supporting device for attaching a structure on a top surface of a roof having a plurality of pieces of a base material, comprising:
   first and second fixing members fixed to said base material; and
   a supporting member carried by said first and second fixing members to fix and support said structure, wherein:
   said first and second fixing members each have a side portion having a fixing portion that is attached to said supporting member, and a bottom surface that contacts said base material, wherein the fixing portions of the first and second fixing members comprises a round fixing hole;

said supporting member comprises:
  a first end having a side portion provided with a plurality of first attachment portions, each said first attachment portion comprising a plurality of attachment holes that are aligned in said longitudinal direction of said supporting member, wherein at least one of the first attachment portions is connected to the fixing portion of the first fixing member, and wherein each said first attachment portion comprises a round hole,
  a second end having a side portion provided with a second attachment portion that is connected to the fixing portion of the second fixing member, wherein the second attachment portion comprises an elongated hole, and
  a top side to fix said structure;
  wherein said plurality of attachment holes of the first attachment portions and said elongated hole are located along a single straight line extending in said longitudinal direction of said supporting member;
  wherein said elongated hole has an effective length determined by $$x+2\{\sqrt{(L^2+R^2)}-L\}$$

where x represents a length of a line segment bounded by centers of two of said attachment holes which are the most distant from each other, L represents an exposure dimension per piece of said base material in a direction of a tilt of said roof, and R represents a distance in a direction perpendicular to a surface of said roof between top surfaces of those two pieces, respectively, of said base material which are adjacent in said direction of said tilt of said roof; and
  wherein said supporting member is connected to said first and second fixing members that are fixed to the base material such that an angle formed between said top side of said supporting member and said bottom surface of the first and second fixing members is variable.

2. The structure mounting and supporting device according to claim 1, wherein:
  said supporting member is connected to at least one of said first attachment portions of said first fixing member pivotably relative to said first fixing member such that a direction perpendicular to said side portion of the first end of the supporting member serves as an axis of pivotation;
  said fixing portion of said second fixing member and said second attachment portion are secured together by a securing member; and
  said elongated hole has a length and a width, the length of the elongated hole being greater than the width, the elongated hole allowing the securing member to secure said fixing portion of said second fixing member to the second attachment portion at a plurality of positions along the elongated hole.

3. The structure mounting and supporting device according to claim 1, wherein:
  said supporting member has more than one said second attachment portion; and
  between adjacent ones of said elongated holes there is an effective interval smaller than a length of a line segment extending between the centers of the two closest attachment holes.

4. The structure mounting and supporting device according to claim 1, wherein said supporting member includes more than one said second attachment portion.

5. The structure mounting and supporting device according to claim 1, wherein said supporting member has opposite ends, as seen in said longitudinal direction, having a joint joining more than one said supporting member together in said longitudinal direction.

6. The structure mounting and supporting device according to claim 1, wherein a plurality of second attachment portions are located at the second end of the supporting member, each of the second attachment portions corresponding to one of the plurality of first attachment portions.

7. A structure mounting and supporting device for attaching a structure on a top surface of a roof having a plurality of pieces of a base material, comprising:
  first and second fixing members fixed to said base material, each of the fixing members having a side portion with a fixing hole; and
  a supporting member attached to the first and second fixing members, the supporting member comprising:
    a first attachment portion located at a first end of the supporting member, wherein the first attachment portion of the supporting member comprises a duty of round attachment holes that extend in a longitudinal direction of the supporting member, and wherein the first attachment portion is pivotally coupled to the first fixing member; and
    a second attachment portion located at a second end of the supporting member, wherein the second attachment portion is coupled to the second fixing member, wherein the second attachment portion comprises an elongated hole having a length and a width, the length of the elongated hole being greater than the width, and wherein the second fixing member can be coupled to the second attachment portion at a plurality of locations along the elongated hole, wherein said plurality of attachment holes of the first attachment on and said elongated hole are located along a single straight line extending in said longitudinal direction of said supporting member; and
  said elongated hole has an effective length determined by $$x+2\{\sqrt{(L^2+R^2)}-L\}$$

where x represents a length of a line segment bounded by centers of two of said attachment holes which are the most distant from each other, L represents an exposure dimension per piece of said base material in a direction of a tilt of said roof, and R represents a distance in a direction perpendicular to a surface of said roof between top surfaces of those two pieces, respectively, of said base material which are adjacent in said direction of said tilt of said roof.

8. The structure mounting and supporting device according to claim 7, wherein a plurality of the first attachment portions are located at the first end of the supporting member.

9. The structure mounting and supporting device according to claim 8, wherein each of the first attachment portions comprises a plurality of round attachment holes that extend in a longitudinal direction of the supporting member.

10. The structure mounting and supporting device according to claim 8, wherein a plurality of the second attachment portions are located at the second end of the supporting member, each of the second attachment portions corresponding to one of the plurality of first attachment portions.

11. The structure mounting and supporting device according to claim 10, wherein each of the second attachment portions comprises an elongated hole, and wherein a distance between adjacent ones of the elongated holes is smaller than a length of a line segment between the centers of the two closest attachment holes.

* * * * *